(12) United States Patent
Noland

(10) Patent No.: US 11,612,992 B1
(45) Date of Patent: Mar. 28, 2023

(54) APPARATUS AND/OR METHOD FOR INSTALLING AND/OR REPLACING VEHICLE COIL SPRING

(71) Applicant: Edmund Bruce Noland, Leesburg, VA (US)

(72) Inventor: Edmund Bruce Noland, Leesburg, VA (US)

( * ) Notice: Subject to any disclaimer, the term of this patent is extended or adjusted under 35 U.S.C. 154(b) by 0 days.

(21) Appl. No.: 17/958,879

(22) Filed: Oct. 3, 2022

Related U.S. Application Data

(60) Provisional application No. 63/303,740, filed on Jan. 27, 2022.

(51) Int. Cl.
  *B25B 27/30* (2006.01)

(52) U.S. Cl.
  CPC ...... *B25B 27/304* (2013.01); *B60G 2206/921* (2013.01)

(58) Field of Classification Search
  CPC .................. B25B 27/304; B60G 2206/921
  USPC ........................................ 254/10.5
  See application file for complete search history.

(56) References Cited

U.S. PATENT DOCUMENTS

| | | | |
|---|---|---|---|
| 2,652,625 A | 9/1953 | Perkins |
| 2,789,342 A | 4/1957 | Pouell |
| 3,384,348 A | 5/1968 | Wicker |
| 4,813,119 A | 3/1989 | Vanbeber |
| 5,031,294 A | 7/1991 | Krueger |

FOREIGN PATENT DOCUMENTS

| | | |
|---|---|---|
| DE | 3810196 | 10/1989 |
| EP | 2 163 349 | 7/2009 |

*Primary Examiner* — Lee D Wilson
*Assistant Examiner* — Aaron R McConnell
(74) *Attorney, Agent, or Firm* — Nixon & Vanderhye PC

(57) ABSTRACT

In certain example embodiments, a vehicle coil clamping kit is provided. A device includes a plate, and tubing and a hoisting mechanism are located on opposing sides thereof. A cable connects to the hoisting mechanism and runs through the tubing. The cable moves responsive to the hoisting mechanism. A support connects to the device and a frame of a vehicle that a coil is to be installed into or removed from. A hook connects to the cable. The tubing is insertable into, and the cable is feedable through, the frame, when the device is connected to the frame via the support. The hook is configured to controllably raise the lower portion of the frame and deform the spring when the spring is being installed, and to permit the lower portion of the frame to be controllably lowered and release tension on the spring when the spring is being removed.

20 Claims, 29 Drawing Sheets

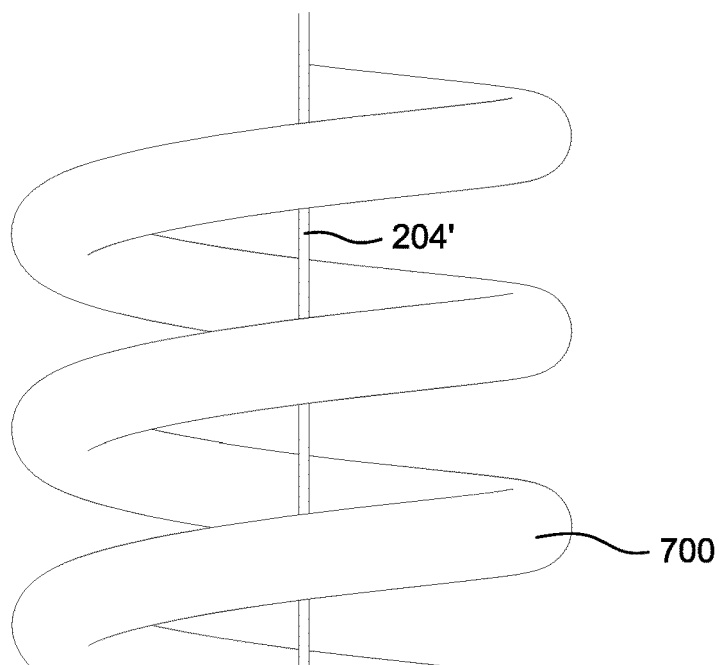
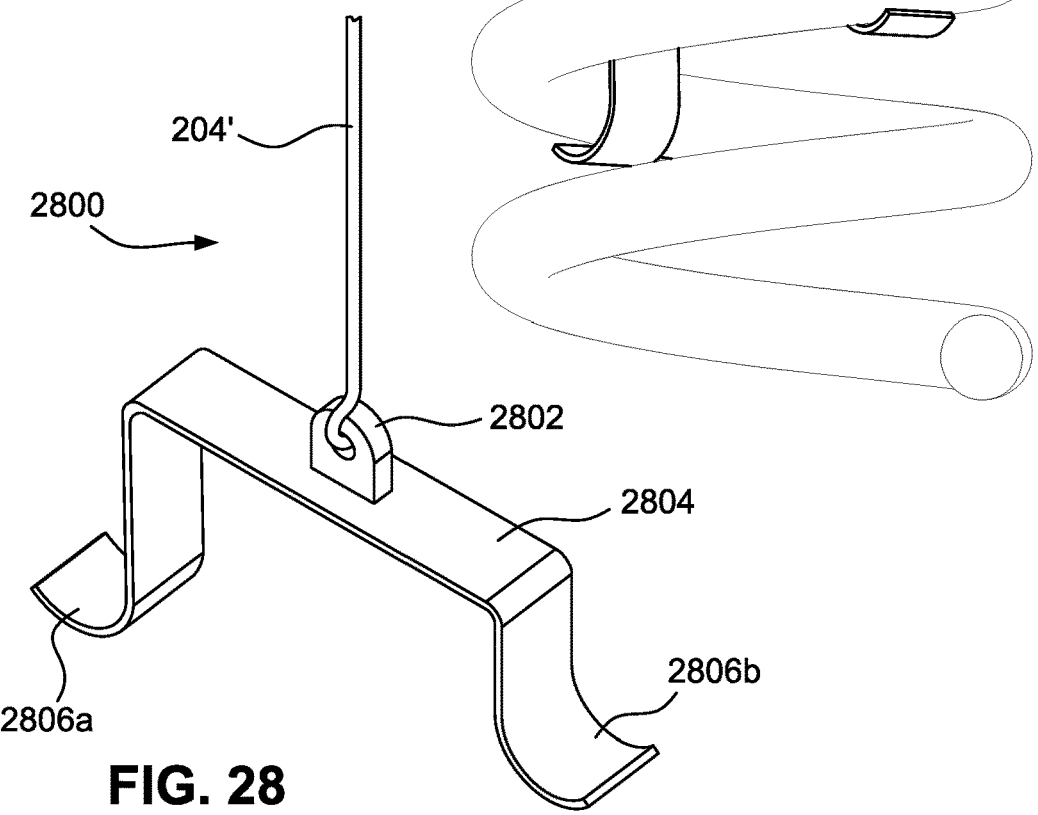
FIG. 29
FIG. 28

APPARATUS AND/OR METHOD FOR INSTALLING AND/OR REPLACING VEHICLE COIL SPRING

CROSS-REFERENCE TO RELATED APPLICATION

This application claims the benefit of U.S. Application Ser. No. 63/303,740 filed on Jan. 27, 2022, the entire contents of which are hereby incorporated herein by reference.

TECHNICAL FIELD

Certain example embodiments described herein relate to an apparatus and/or method for installing and/or replacing a vehicle's coil spring.

BACKGROUND AND SUMMARY

Coil springs are used in suspensions for a wide variety of different vehicles including, for example, automobiles, tractors, airplanes, and the like. Coil springs help reduce vibrations coming off a surface of travel (e.g., vibrations coming off the road in the case of a car or truck). Springs essential absorb energy the energy coming from the travel surface related to imperfections or non-uniformities like potholes or speed bumps, as well as energy arising from acceleration and braking, etc.

Generally speaking, coil springs are thick pieces of iron that are bent into helical shapes. They are generally matched to a vehicle's (or a class of vehicle's) characteristics, such as weight and performance. Springs for automobiles in particular can be designed to have linear spring performance or progressive spring performance.

Most cars and many trucks have four coil springs, with one supporting each corner of the car. Coil springs in general do not require maintenance per se, but they sometimes need to be replaced. For example, a coil spring can break, becoming a safety concern. A broken coil spring can prevent a vehicle's suspension from functioning as intended, puncture a tire, jam another part, fall off and become a hazard to oneself or others, etc. Other problems can involve unwanted vehicle sagging, uneven tire wear, unusual noise emanating from the vehicle's underside, potential harsh bouncing movements, troubling vehicle sway, etc. For older or classic cars, coil springs can rust.

Automotive manufacturers have from time-to-time issued recalls to have coil springs replaced. For example, several automotive manufacturers issued recalls when it was discovered that salt used to treat roads for winter weather conditions could cause certain springs to corrode and potentially even fracture.

Thus, it will be appreciated that there are a wide variety of circumstances that might lead to a vehicle's coil spring needing to be replaced.

Unfortunately, however, removing and replacing vehicle suspension coil springs can be a difficult and dangerous task for both professional technicians and hobbyists. Problems arise because there is really no suitable equipment available to complete the work associated with removing and replacing a vehicle's suspension coil springs.

Currently, for automobiles, the job of coil spring removal and replacement begins with a vehicle on a lift. The wheel is removed, as is the shock absorber. In most cases, the steering linkage must be removed, as well. A floor jack is then placed under the vehicle's lower control arm and strapped/chained to the vehicles frame. Then, a technician will jack a jack until it comes into contact with the lower control arm. The technician will continue applying lift to the lower control arm to release the pressure of the coil spring on the ball joint. The pressure and high energy of the spring is now "trapped" between the jack and frame of the car.

The technician then will remove the cotter pin from the ball joint nut and loosen the nut approximately one-quarter inch, depending on the vehicle. Next, the technician will use a "pickle fork" (ball joint separator) to separate the ball joint from the spindle. Then, the technician will release pressure on the jack to allow about one-quarter inches of movement of the lower control arm. The technician will now slowly loosen the ball joint nut until it can be removed.

At this point, there can be serious problems. For example, the jack pressure must be released, and the coil spring can attempt to "roll away" from the vehicle all the while straining against the straps/chains that hold it in place. Coil springs for automobiles are manufactured resist being bent to fit the geometry of automotive suspensions. Thus, as more pressure is released, the coil spring will try to straighten itself out as the lower control moves in an arc. Serious injuries have occurred at this point, as the coil spring can come leaping out at this point and it is very difficult to react quickly enough to avoid contact.

Installation involves a reversal of the procedure above and similarly can be fraught with peril.

Certain example embodiments help address the above-described and/or other concerns. For example, certain example embodiments help address problems and dangers that accompany coil spring removal and replacement.

Certain example embodiments include a ratcheting or other hoist mechanism and specific mounting apparatus for the vehicle that is being serviced. The hoist mechanism is mounted to a work plate that is in turn attached to one or more steel tubes (e.g., of or comprising 4130 Chromoly steel) that is/are formed to support the hoist and work plate, as well as route a steel cable or Dyneema cord.

This equipment is mounted directly over the upper mounting hole of the shock absorber. But before the equipment is put in place, a technician pulls enough cable or cord through the tubes to route it through the shock absorber hole and through the coil spring and lower control arm to the button plate. An additional 30 inches typically will be more than sufficient for most automotive applications.

Once this initial routing has been completed, the equipment is put into place. Then, the technician will thread the cable or cord through the coil spring and control arm, and fasten it to the swivel mount on the button plate.

Next, the technician will slowly ratchet or otherwise tighten the cable or cord while making certain the coil spring is in its proper placement. It will be appreciated that the cable or cord now has the spring captured and, even if the spring moves around, it will not be allowed to escape to cause injury. The technician will continue to ratchet or otherwise tighten the entire assembly until the lower ball joint can be secured to the spindle.

Now, the technician can loosen the hoist cable or cord and release it from the button and remove all of the equipment form the vehicle and install the shock absorber and wheel, etc.

To remove a coil spring, the technician will remove the parts mentioned above, then drop the cable or cord down through the shock absorber hole and through the lower control arm, and attach to the button plate. Then, the button plate can be ratcheted or otherwise moved into place as pressure is applied to the lower control arm. The ball joint is loosed (typically one-quarter inch in an automotive application), the ball joint is released from the spindle. Then, the lower control arm is slowly lowered until pressure/energy is released from the coil spring.

In certain example embodiments, a vehicle coil clamping kit is provided. The kit includes a hoisting mechanism; and a device comprising a plate, tubing, and a cable. The tubing and the hoisting mechanism are located on opposing sides of the plate, with the cable being connected to the hoisting mechanism and running through a body of the tubing such that at least a portion of the cable protrudes through an end of the tubing opposite the plate, and with the cable being movable in response to manipulation of the hoisting mechanism. At least one support member is removably connectable to the device and a frame of a vehicle that a coil is to be installed into or removed from. At least one hook is connectable to the cable. The tubing is insertable into, and the cable is feedable through, the frame, when the device is connected to the frame via the at least one support member. The coil is locatable in the frame between upper and lower portions thereof. The at least one hook is configured to controllably raise the lower portion of the frame and deform the spring when the spring is being installed, and the at least one hook is configured to permit the lower portion of the frame to be controllably lowered when the spring is being removed.

According to certain example embodiments, the hoisting mechanism may be a winch, hand crank, or the like.

According to certain example embodiments, the at least one support member may be an A-frame.

According to certain example embodiments, the at least one support member may comprise a first support member and a second support member, e.g., with the first support member being an A-frame and the second support member being a rod with a portion sized, shaped, and arranged to fit around a portion of the frame.

According to certain example embodiments, the at least one hook may be a grappling hook.

According to certain example embodiments, the at least one hook may comprise first and second hooks, e.g., with the first hook being a grappling hook and/or the second hook being a J-shaped hook. For example, the J-shaped hook may be sized, shaped, and arranged to hook around a coil of the spring during partial location of the spring during spring installation and during removal of the spring; and/or the grappling hook may be configured to controllably raise the lower portion of the frame and deform the spring when the spring is being installed, and to permit the lower portion of the frame to be controllably lowered when the spring is being removed.

According to certain example embodiments, the at least one hook may be an attachment having a cross member and first and second curved hook portions, e.g., with the cross member having first and second sides opposite one another. The first and second curved hook portions may extend downwardly from the first and second sides, respectively. The first and second curved hook portions may have different heights and are configured to interface with different portions of the spring.

According to certain example embodiments, the tubing may comprise first, second, and third portions, the first and second portions may be substantially parallel to one another and may be separated from one another by the third portion, and the cable may extends through each of the first, second and third portions. In certain example embodiments, offset bushings may be provided in the tubing to help route the cable therethrough, e.g., with the offset bushings being located at least proximate to where the first and second portions meet and/or where the second and third portions meet.

According to certain example embodiments, a band that is to be tied around the frame and the spring may be provided, e.g., to restrict movement of the spring during spring installation/removal.

According to certain example embodiments, the vehicle may be an automobile, and the upper and lower portions of the frame are upper and lower control arms of the automobile.

In certain example embodiments, a method of installing a spring in a frame of a vehicle is provided. The frame has upper and lower portions between which the spring is to be located. The method comprises having the vehicle coil clamping kit described herein; connecting the device to the frame via the at least one support member; feeding the cable through at least the upper portion of the frame; partially locating the spring in the frame between the upper and lower portions of the frame; feeding the cable through the lower portion of the frame; allowing the at least one hook to contact an underside of the lower portion of the frame; and drawing the lower portion of the frame closer to the upper portion of the frame using the hoisting mechanism such that the spring controllably deforms into a fully located, installed position.

In certain example embodiments, a method of removing a spring from a frame of a vehicle is provided. The frame has upper and lower portions between which the spring is located. The method comprises: having the vehicle coil clamping kit described herein; connecting the device to the frame via the at least one support member; feeding the cable through at least the upper and lower portions of the frame; allowing the at least one hook to contact an underside of the lower portion of the frame; controllably lowering the lower portion of the frame using the hoisting mechanism such that tension on the spring is controllably released; and once a threshold amount of tension on the spring has been released, removing the spring from the frame.

In certain example embodiments, a coil clamping device is provided for installing between/removing from upper and lower arms of a frame of a vehicle a spring. The device comprises: a hoisting mechanism; a plate; tubing, wherein the tubing and the hoisting mechanism are located on opposing sides of the plate; a cable connected to the hoisting mechanism and running through a body of the tubing such that at least a portion of the cable protrudes through an end of the tubing opposite the plate, the cable being movable in response to manipulation of the hoisting mechanism, the cable being lowerable through the lower arm of the frame of the vehicle when the spring is being installed/removed; one or more mounts to which at least one support member is removably connectable, the at least one support member also being removably connectable to the frame; and at least one hook connected to the cable and configured to engage with an underside of the lower arm to enable the lower arm to be controllably raised and to deform the spring during spring installation, and to permit the lower arm of the frame to be controllably lowered and to release spring tension during spring removal.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 28 is a perspective view of an offset single point attachment that may be used to lift and/or compress the spring, in accordance with certain example embodiments; and FIG. 29 shows the attachment connected to the spring, in accordance with certain example embodiments.

DETAILED DESCRIPTION

Figure 1:
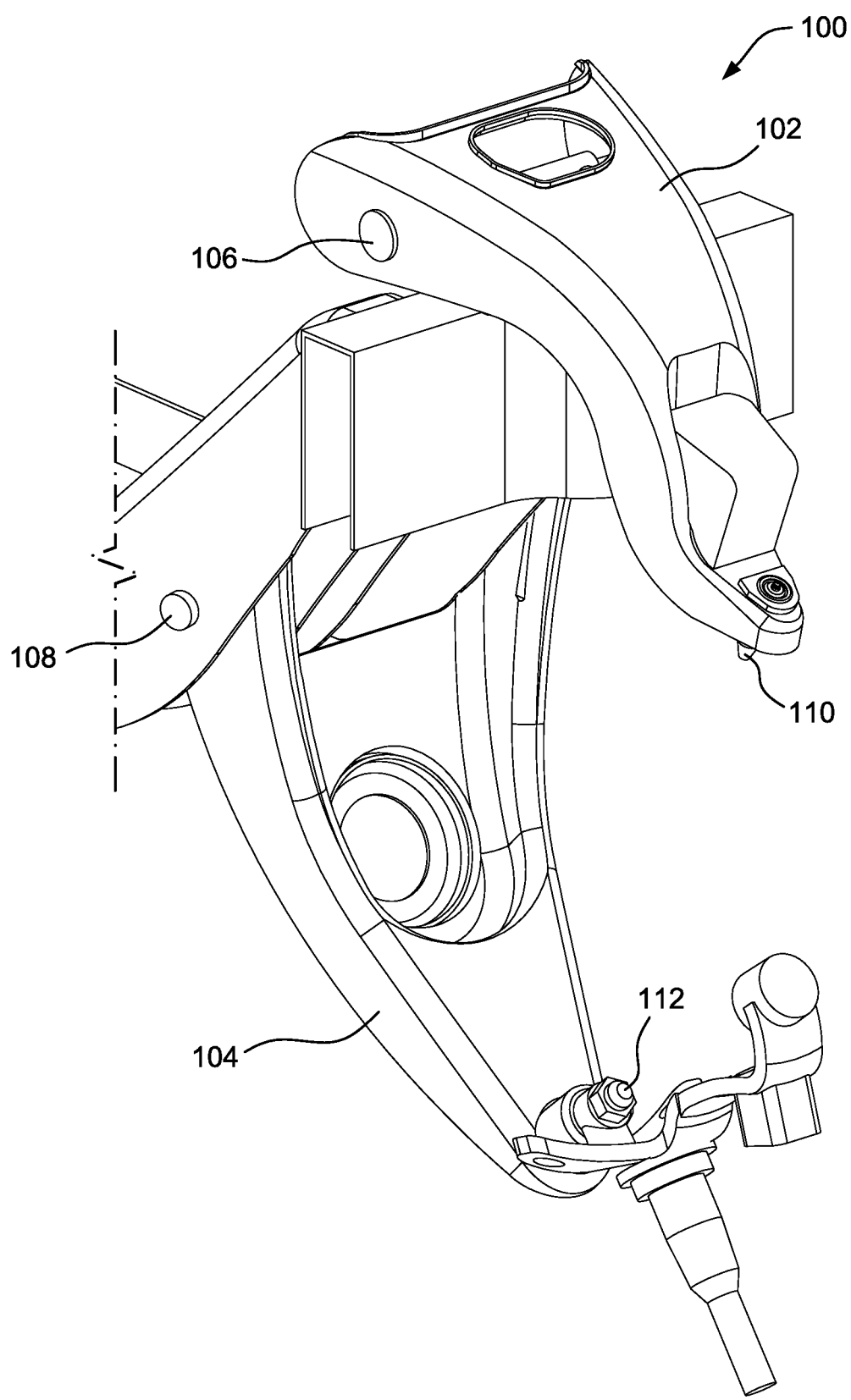
FIG. 1 is a portion of an automotive sub-frame 100 into which a suspension coil spring will be installed.

Certain example embodiments described herein relate to an apparatus and/or method for installing and/or replacing a vehicle's coil spring in a safe and controlled manner. The vehicle may be an automobile, tractor, airplane, or other vehicle that uses coil springs or the like. Referring now more particularly to the drawings, FIG. 1 is a portion of an automotive sub-frame 100 into which a suspension coil spring will be installed. The sub-frame 100 resembles one that might be found in a 1969 Pontiac Firebird, except that portions have been removed for ease of explanation. The sub-frame 100 includes an upper control arm 102 and a lower control arm 104, both of which lift or pivot up. Upper bushings 106 are provided on opposing sides of the sub-frame 100 and aid in the pivoting of the upper control arm 102. Similarly, lower bushings 108 are provided on opposing sides of the sub-frame 100 and aid in the pivoting of the lower control arm 104. The shock absorber hole is located under the upper control arm 102 and can be seen once the upper control arm 102 is lifted up. Upper and lower ball joints 110, 112 are provided to the upper control arm 102 and lower control arm 104, respectively.

Figure 2:
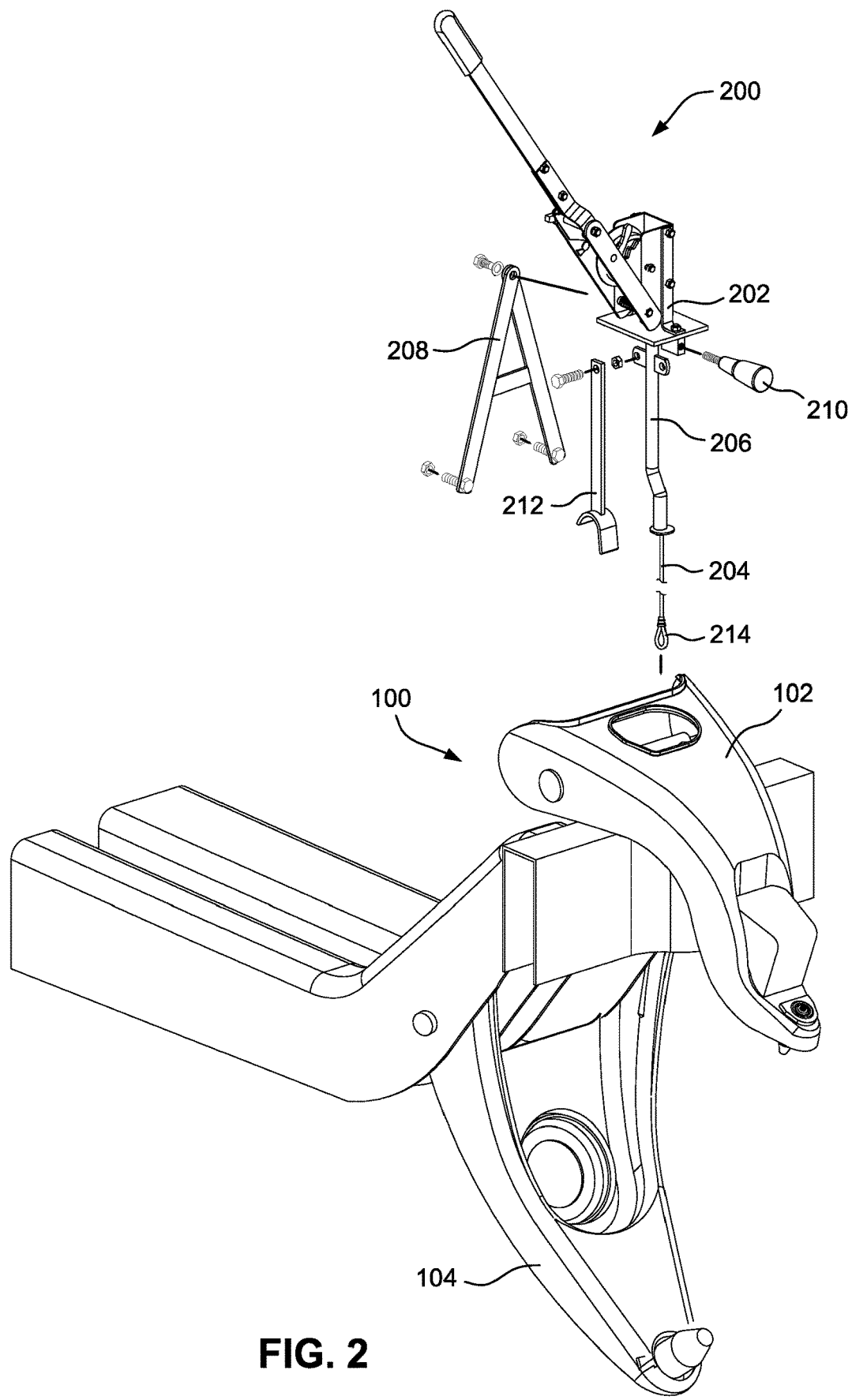
FIGS. 2-3 show an exploded view of a device used for installing a coil spring in the sub-frame of FIG. 1, in accordance with certain example embodiments.
Figure 3:
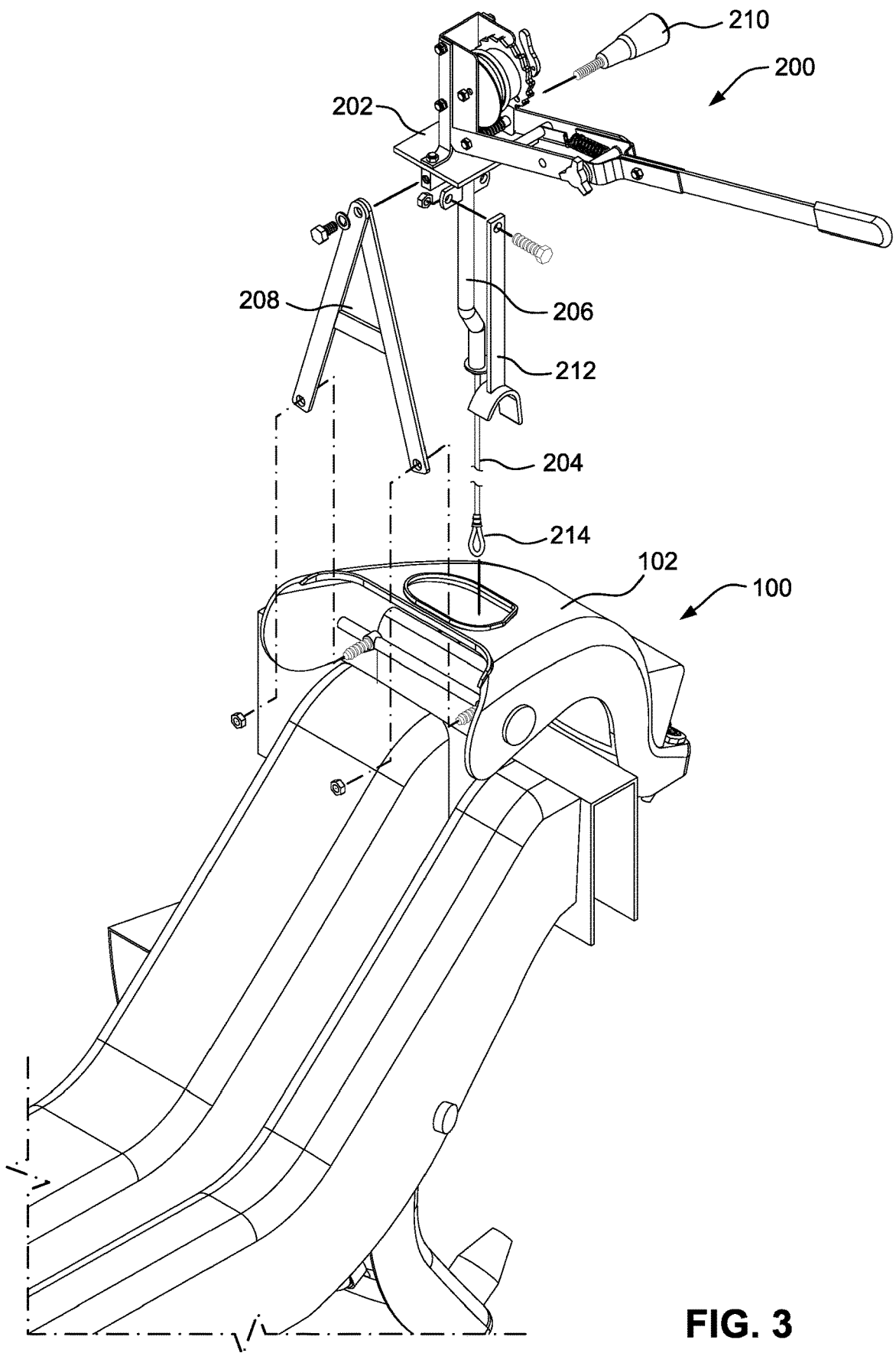

FIGS. 2-3 show an exploded view of a device 200 used for installing a coil spring in the sub-frame 100 of FIG. 1, in accordance with certain example embodiments. The device 200 includes a winch assembly 202. A cable 204 connected to the winch assembly 202 is fed through tubing 206, which may be formed from any suitable material (such as, for example, chromoly). Offset-hardened bushings are located inside the body of the tubing 206 to help guide the cable 204 therethrough. The cable 204 preferably is wiped down and greased each time before use.

In the example shown in FIGS. 2-3, the tubing 206 is constructed with a dogleg design to accommodate some vehicle configurations. For example, for some sub-frames positioned in cars, there may be an inner fender panel or other structure that might otherwise interfere with a more linear or "direct" straight tube structure interfacing with the shock absorber hole located under the upper control arm 102. When a dogleg design is used for the tubing 206, welding may be used to connect different portions, tubing can be cast into a desired shape.

Figure 22A:
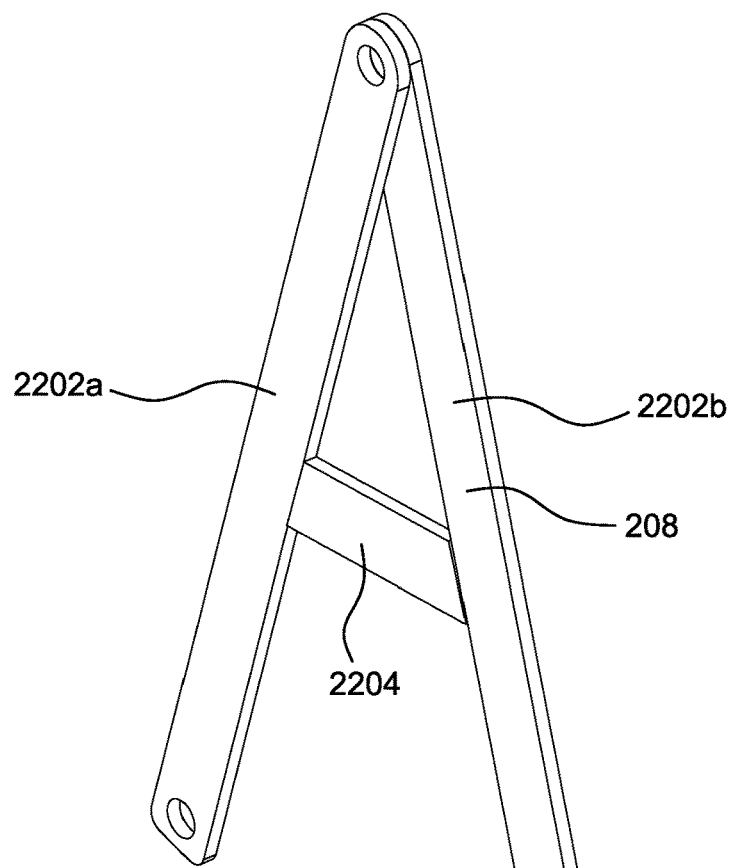
FIGS. 22A-22B are enlarged views of the A-frame positioning brace, in accordance with certain example embodiments.
Figure 22B:
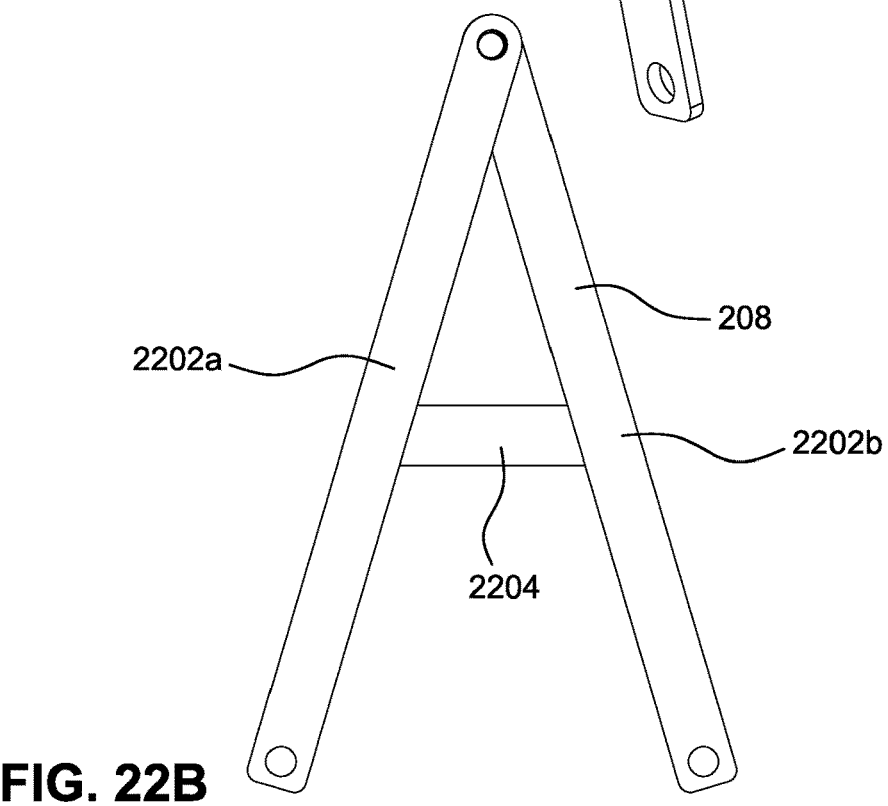

An A-frame positioning brace 208 and handle 210 helps to steady the device 200 as the winch assembly 202 is cranked in use. The handle may be removable in certain example embodiments. FIGS. 22A-22B are enlarged views of the A-frame positioning brace 208, in accordance with certain example embodiments. As shown in these drawings, the A-frame positioning brace 208 includes first and second legs 2202a, 2202b along with a cross support 2204. Some or all of these components may be bolted and/or welded together. In other words, some or all of the seems may be welded together so that the A-frame positioning brace 208 is an integral component in certain example embodiments. Different lengths of the legs 2202a, 2202b and/or cross support 2204 may be provided in different example embodiments. Moreover, the angle between the legs 2202a, 2202b may vary based on the particular configuration of the vehicle.

An additional brace 212 can be used in some applications. In certain example embodiments, the additional brace 212 may be the only brace that is used, e.g., if there is not much room to operate.

At the end of the cable 204 opposite the winch assembly 202, a loop 214 is provided. The loop 214 interfaces with a pulley provided to different components, e.g., as described in greater detail below.

As mentioned above, the device 200 is shown in a partially exploded view. The components of the device 200 including, for example, the winch assembly 202, tubing 206, A-frame positioning brace 208, and/or additional brace 212, may be bolted or otherwise fastened together. In certain example embodiments, some or all of these components may be integrally formed.

Figure 4:
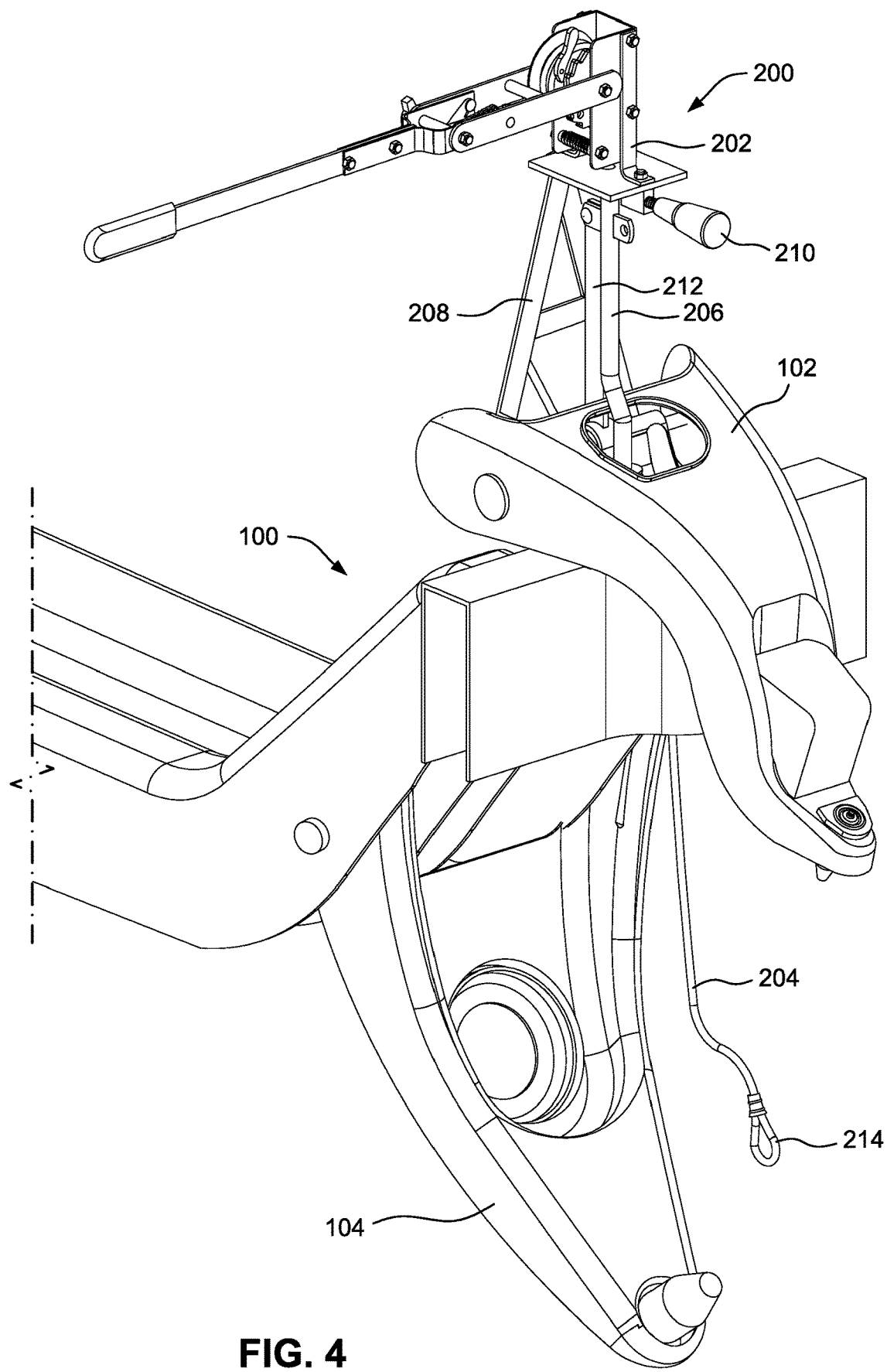
FIGS. 4-6 show the device connected to the sub-frame in accordance with certain example embodiments.
Figure 5:
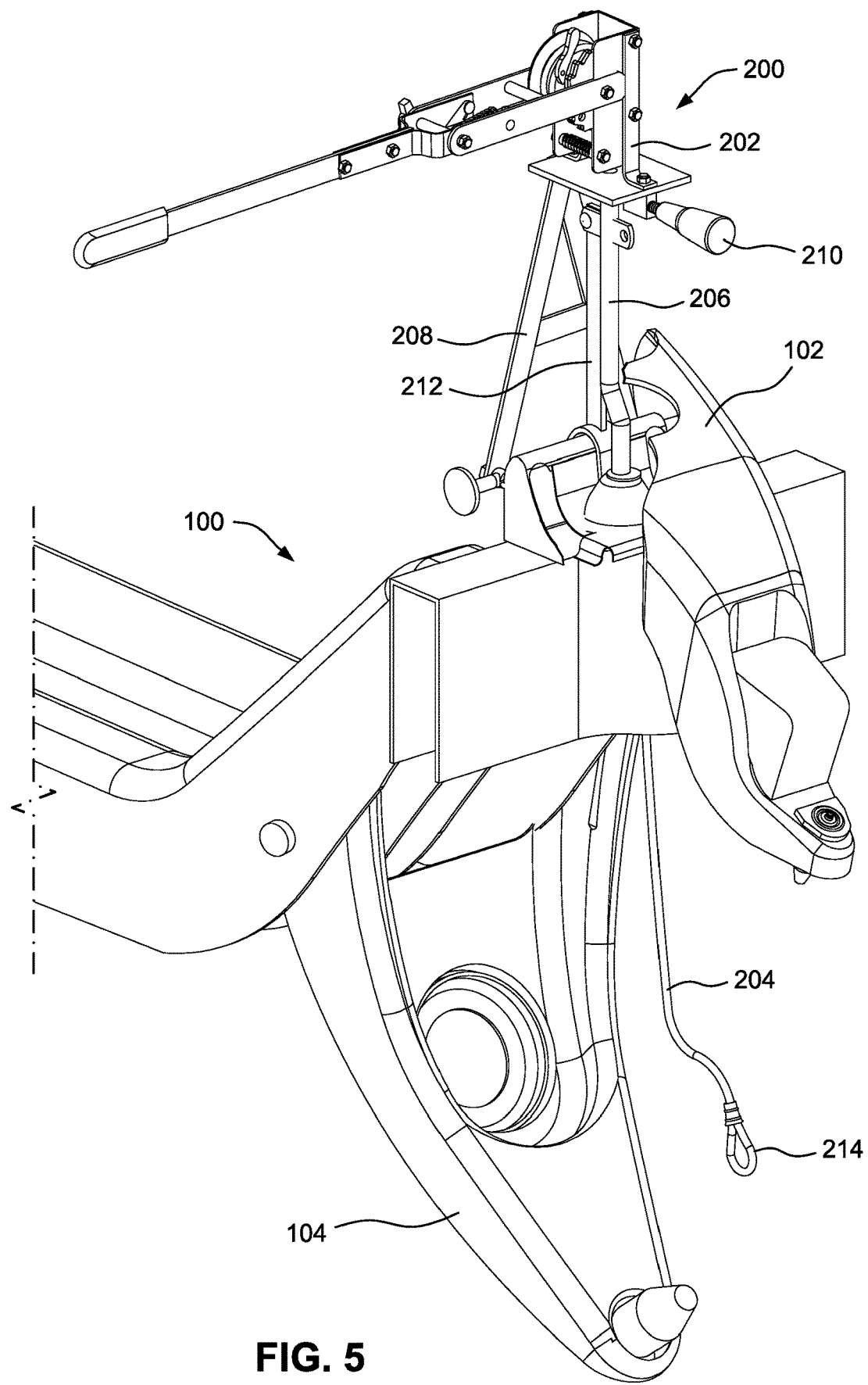
Figure 6:
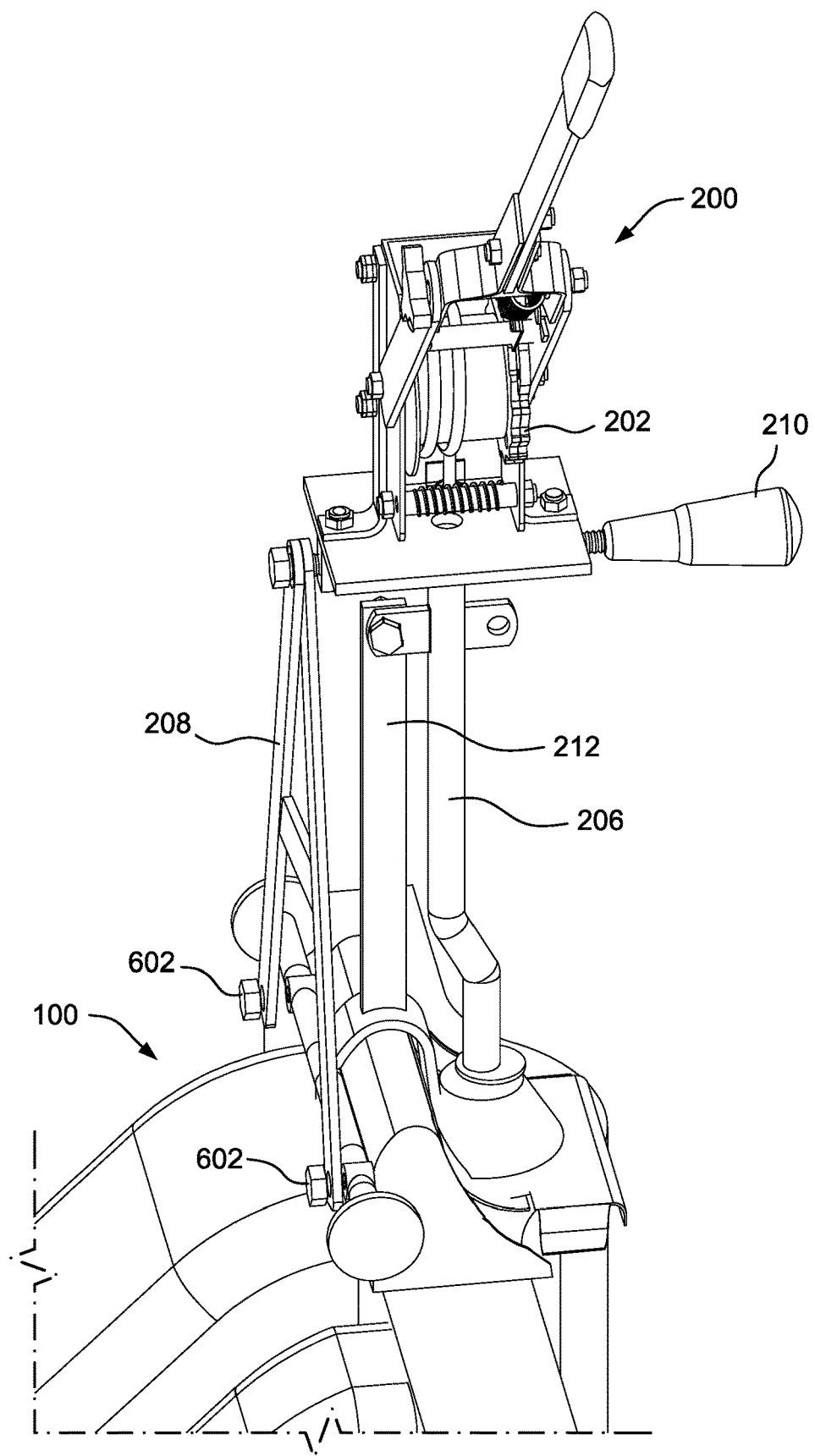

FIGS. 4-6 show the device 200 connected to the sub-frame 100 in accordance with certain example embodiments. In FIG. 5, a portion of the upper control arm 102 has been cutaway to show the tubing 206 interfacing with the shock absorber hole. Likewise, in FIG. 6, the upper control arm 102 has been removed for ease of understanding where certain features are located.

As shown in FIGS. 4-6, the A-frame positioning brace 208 is fastened to the sub-frame 100 via nuts and washers 602 at a position behind the upper control arm 102. The winch assembly 202 is moved into position adjacent to the A-frame positioning brace 208, and the cable 204 is fed through the upper control arm 102 and through the shock absorber hole, so that the loop 214 protrudes through the sub-frame 100 to a position that is accessible from below the upper control arm 102. The winch assembly 202 is connected to A-frame positioning brace 208 via removable bolts in certain example embodiments. Thus, the device 200 is securely fastened to the sub-frame 100 as a workpiece.

The handle 210 is screwed or otherwise connected to the winch assembly 210 to give the technician something to hold onto while the winch assembly 202 is being operated. This can provide stability for the technician, making it easier for the technician to balance during the winching.

Figure 23A:
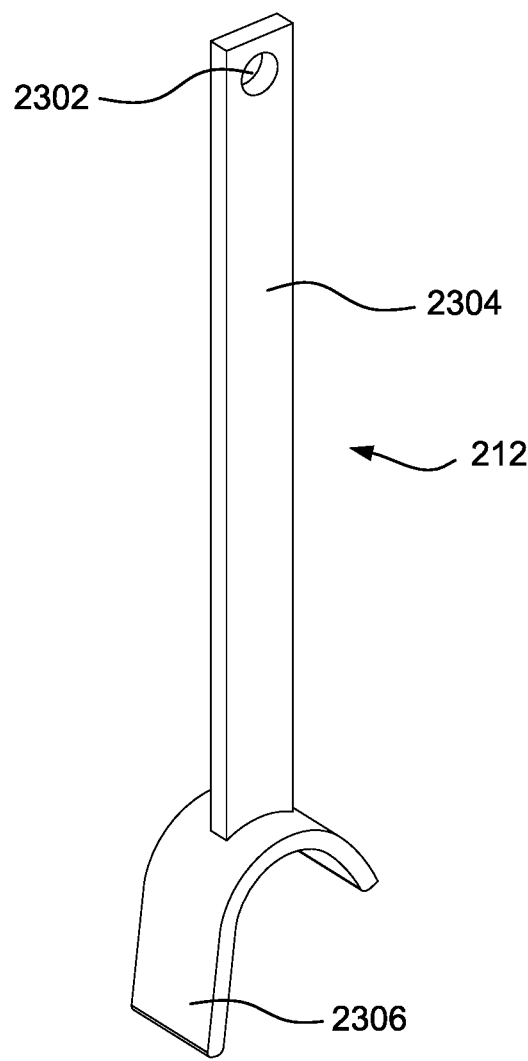
FIGS. 23A-23B show enlarged views of the additional brace, in accordance with certain example embodiments.
Figure 23B:
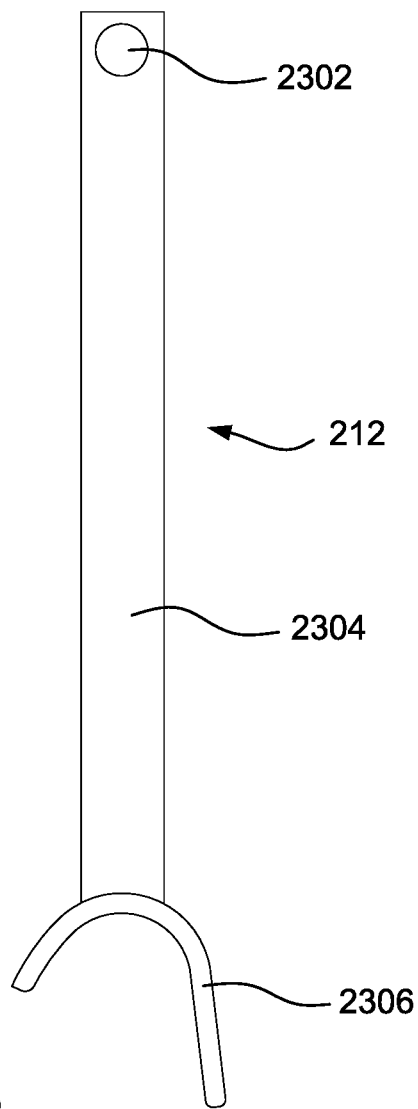
Figure 24A:
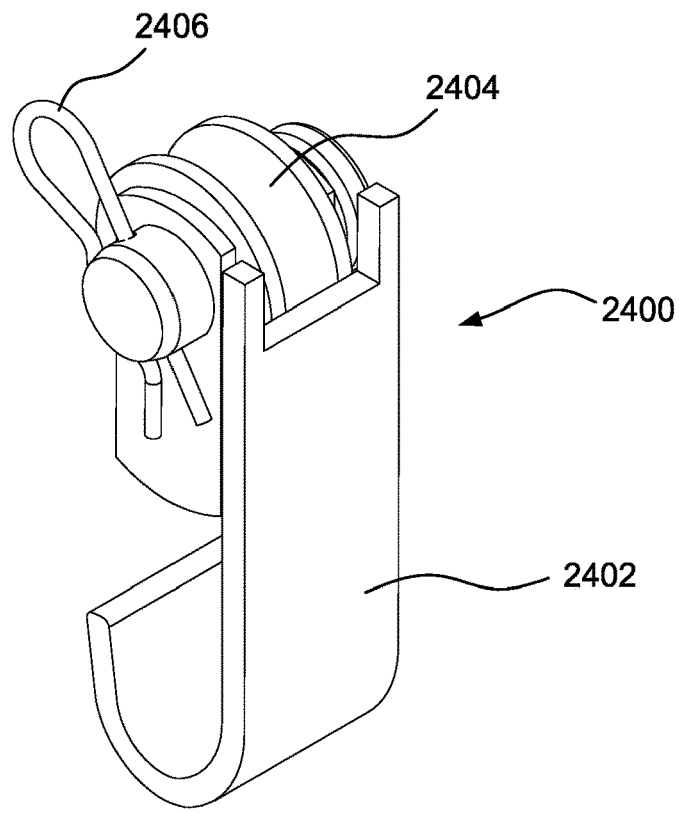
FIGS. 24A-24D show an example J-hook assembly, in accordance with certain example embodiments.
Figure 24B:
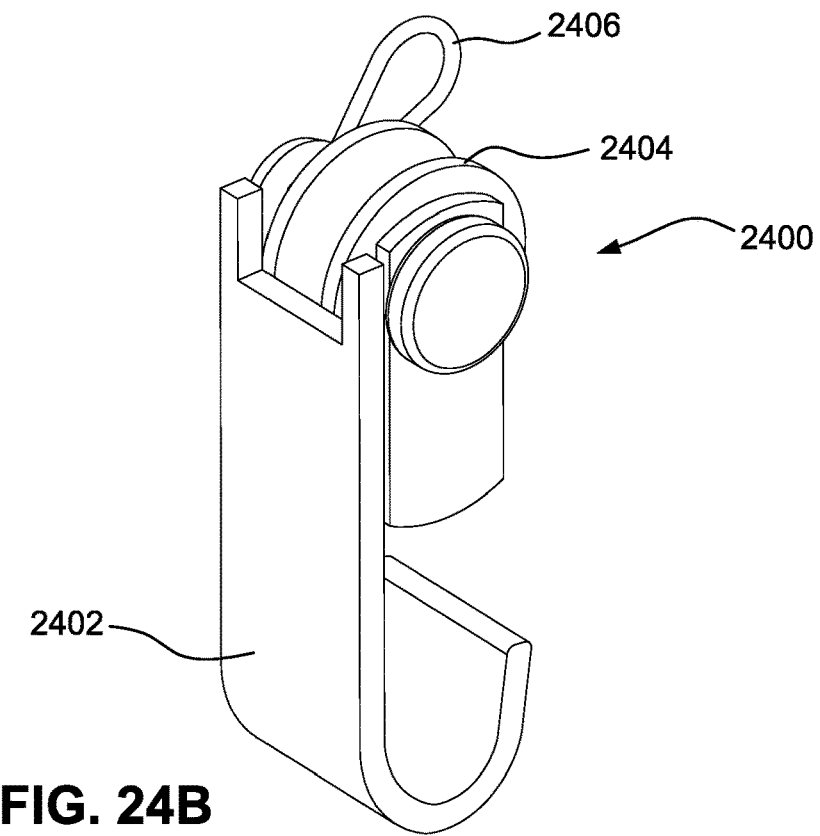
Figure 24C:
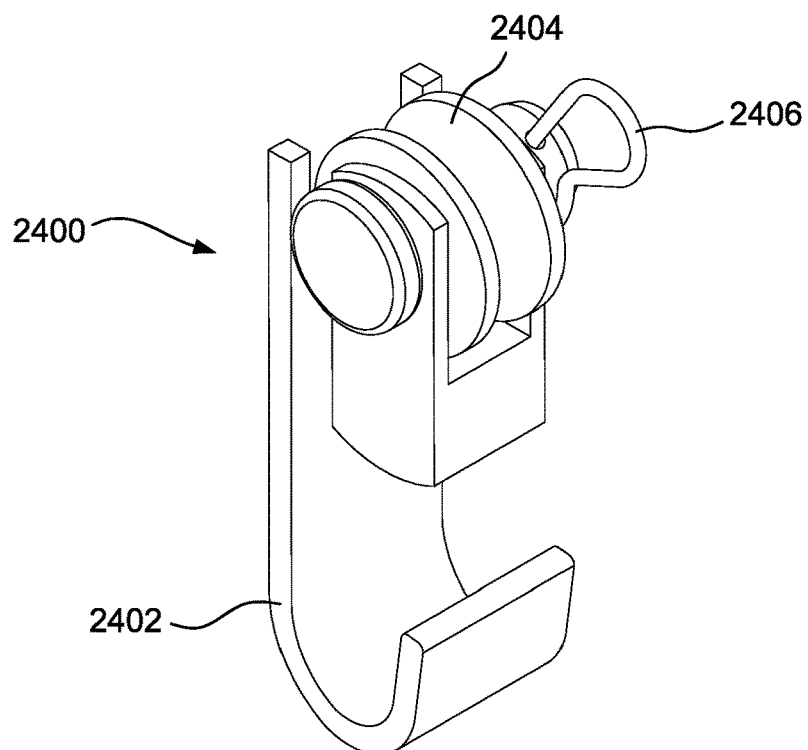
Figure 24D:
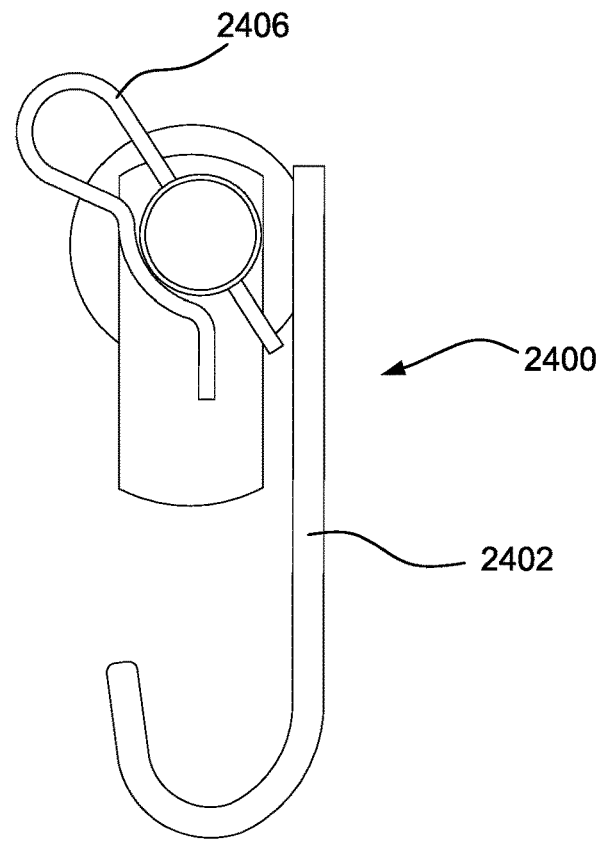

As shown in FIGS. 4-6, the additional brace 212 also is connected to the device 200 and the sub-frame 102. This additional brace 212 may be formed from the same or different material as the A-frame positioning brace 208 in different example embodiments. FIGS. 23A-23B show enlarged views of the additional brace 212, in accordance with certain example embodiments. The additional brace 212 may be bolted to the device 200 in certain example embodiments, e.g., via hole 2302. The additional brace 212 includes a generally rectangular body portion 2304 and a cupped portion 2306 at an end thereof opposite the hole 2302. The cupped portion 2306 at least loosely engages with a portion of the sub-frame 100 and/or upper control arm 102 to provide further support and protect against pivotal or other motion.

Once the device 200 is connected to the sub-frame 100 and the coil 204 is fed through the upper control arm 102, the technician can begin spring insertion. The spring includes a plurality of coils and may be fabricated in any suitable manner. For example, in automotive applications, some suspension coil springs have machined top ends and cutoff lower ends. Third-party springs may be used depending on the application. For example, for a 1969 Firebird, a Landrum 800 Spring may be used. This example spring is a bit longer than might otherwise be needed for a 1969 Firebird, and it is quite resilient, because it is a racing spring. These aspects of the example spring help demonstrate the ease with which springs in general can be placed using, and emphasize the safety aspects of, certain example embodiments.

Figure 7:
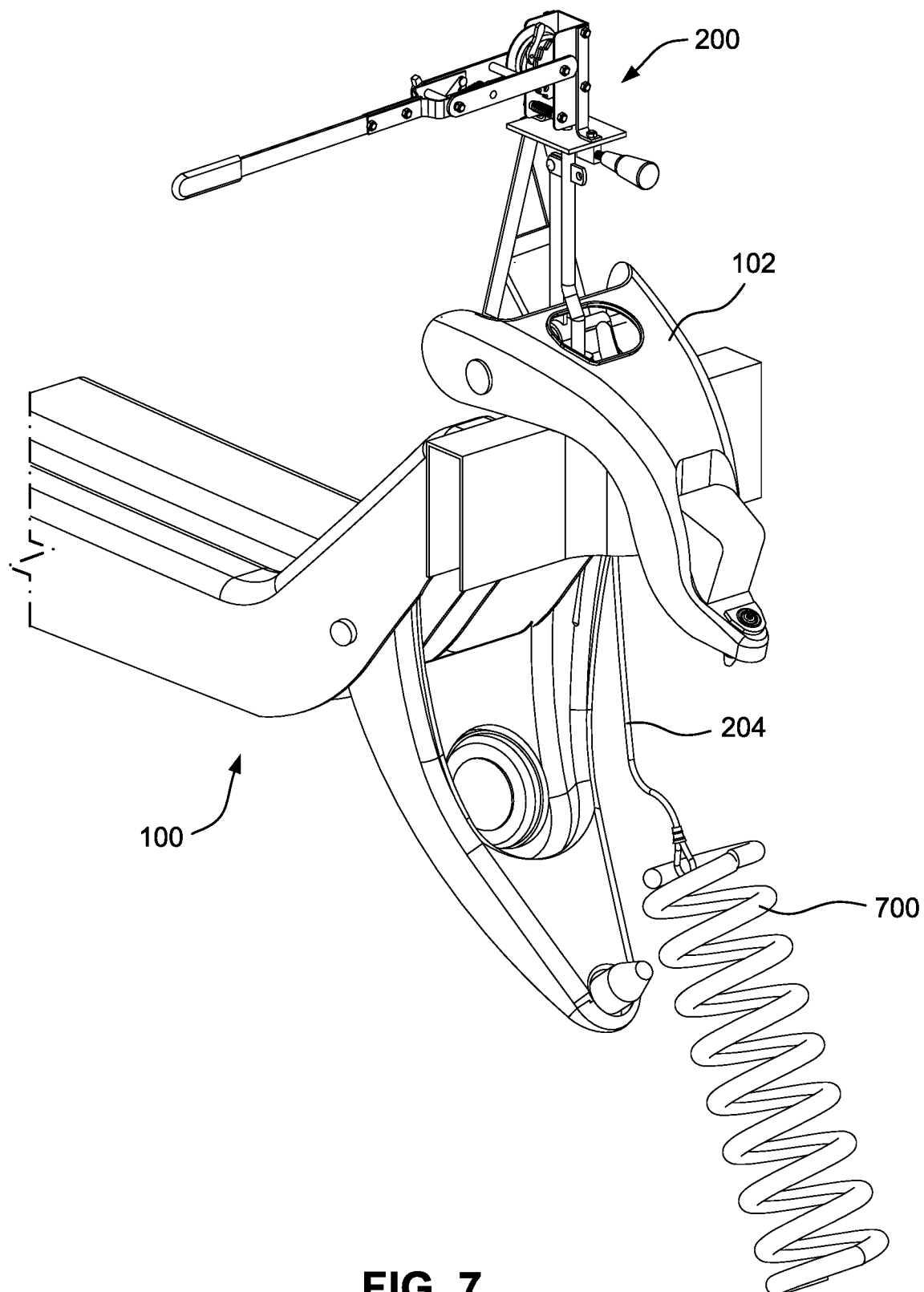
FIG. 7 shows the device connected to the sub-frame, with the cable being fed through the upper control arm, and into the spring, in accordance with certain example embodiments.
Figure 8:
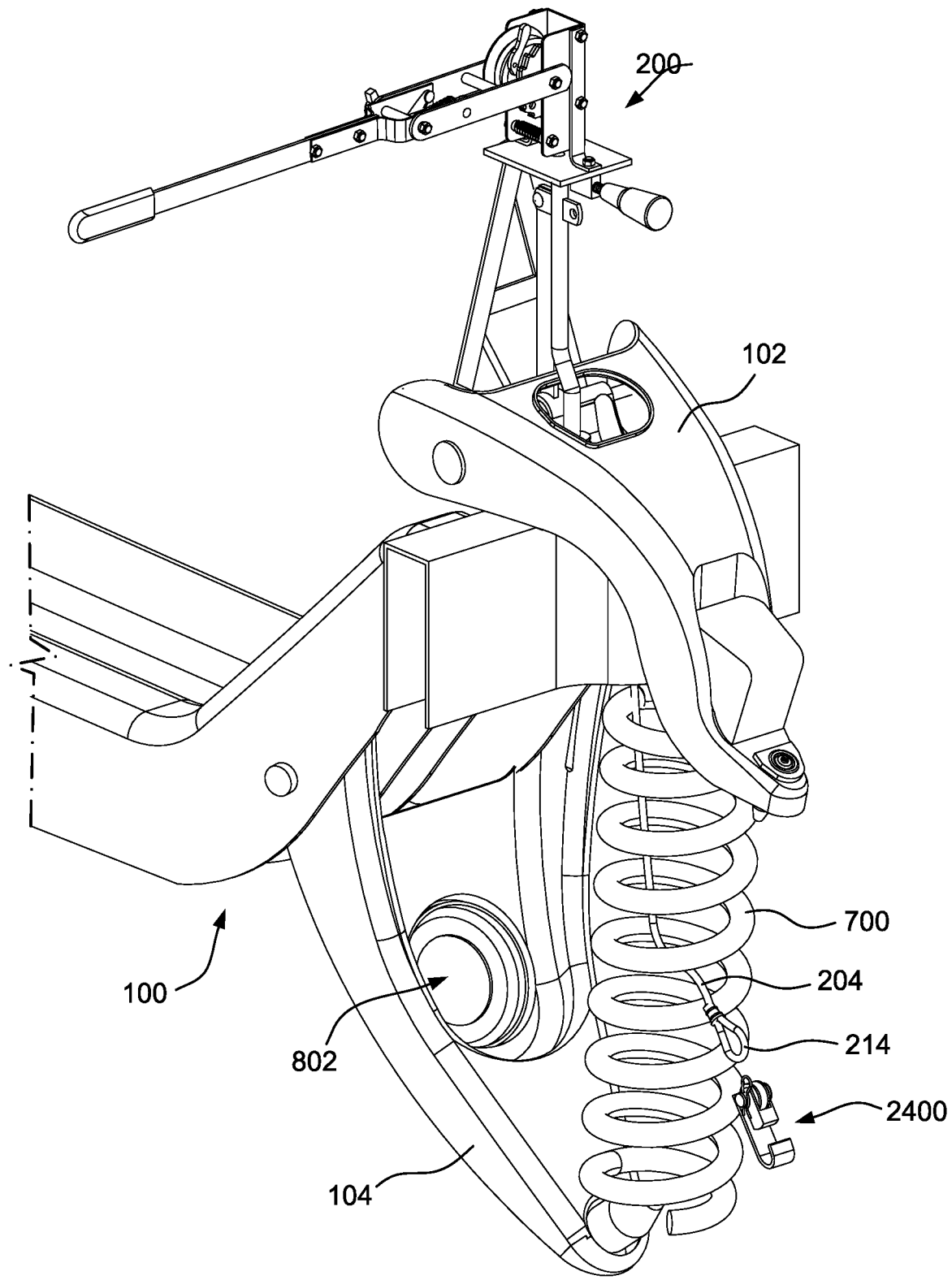
FIG. 8 shows the beginnings of the spring being placed into the sub-frame, in accordance with certain example embodiments.

FIG. 7 shows the device 200 connected to the sub-frame 100, with the cable 204 being fed through the upper control arm 102, and into the spring 700, in accordance with certain example embodiments, and FIG. 8 shows the beginnings of the spring 700 being placed into the sub-frame 100, in accordance with certain example embodiments. As shown in FIG. 8, the top of the spring 800 is placed under the upper control arm 102. The lower control arm 104 includes a recess 802 for accommodating the lower part of the spring 700. The recess 802 may be formed with a geometry that matches the lowest portion or lowest coil of the spring 700. For instance, if the spring 700 is cut off at the bottom, the recess may be specifically shaped to accommodate that cutoff portion. In such cases, once the top of the spring 700 is inserted into the upper control arm 102, it can be rotated (also sometimes called timed) so that its lower part fits into the recess 802.

Oftentimes, one of the most difficult aspects of installing a coil spring involves positioning the lower (oftentimes cutoff) part of the spring into a recess formed in the lower control arm 104. In this regard, the bottom of the spring 700 can be rocked backwards towards the sub-frame 100. It is noted that some sub-frames include sway bars and/or tie rods, which may need to be removed prior to rocking springs even partially backwards. In any event, given the rigidity of the coils in the spring 700, it can be difficult if not impossible to move the bottom of the spring 700 all the way back to the recess 802 without special tools. Moreover, this portion of the installation can be hazardous because the spring 700 will resist bending. If it is not properly secured, it can fly off of, or out from, the sub-assembly 100 and potentially cause grievous injury to the technician. Thus, the spring 700 can be rocked backwards towards the sub-frame 100 can be rocked backwards only so far from both human strength and human safety perspectives.

Therefore, in certain example embodiments, the spring 700 is positioned with the aid of a J-hook assembly 2400 that is used with the device 20. FIGS. 24A-24D show an example J-hook assembly 2400, in accordance with certain example embodiments. As shown in FIGS. 24A-24D, the J-hook assembly 2400 includes a hook 2402. A roller bearing pulley assembly 2404 is connected to the hook 2402 with a pin and cotter pin 2406 that may be ⅜ inch in certain example embodiments.

Figure 9:
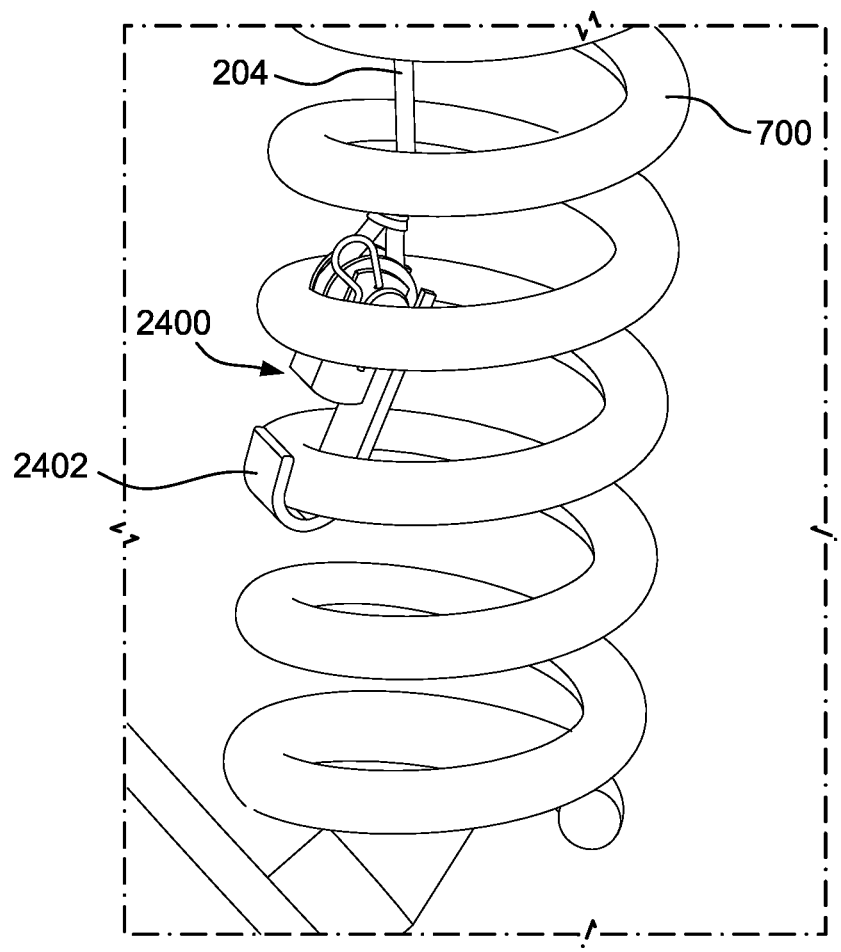
FIG. 9 shows the hook of the J-hook assembly hooking to one of the coils of the spring, in accordance with certain example embodiments.

The cable 204, previously fed at least partially through the spring 700 as described above, is pulled out through the spring 700 between two adjacent coils. Then, the pulley assembly 2404 of the J-hook assembly 2400 is fed through the loop 214 of the cable 204, and locked using the pin and cotter pin 2406. In accordance with certain example embodiments, the hook 2402 of the J-hook assembly 2400 hooks to one of the coils of the spring 700, as shown in FIG. 9. In order to position the hook 2402 proximate to a desired coil, the winch assembly 202 may be winched to draw the cable 204 upwardly, or the winch assembly 202 may be relaxed to allow more slack for the cable 204. This positioning may be performed by the technician, or with the aid of another person. It sometimes may be difficult for just one person to reach around and manually manipulate the winch assembly 202 because the front of the vehicle might protrude outwardly, making it difficult for the person to reach around it, but the techniques of certain example embodiments certainly can be performed by just one person in many instances.

In some instances, it may be desirable to position the hook 2402 on the third coil from the bottom of the spring 700. However, different vehicles and/or springs may argue in favor of different placements in different instances. Care may be taken to ensure that the top of the spring 700 is properly positioned relative to the upper control arm 102. For example, prior to proceeding to the next step, a visual inspection may be performed to ensure that the coil 700 properly engages with the upper control arm 102.

Figure 10:
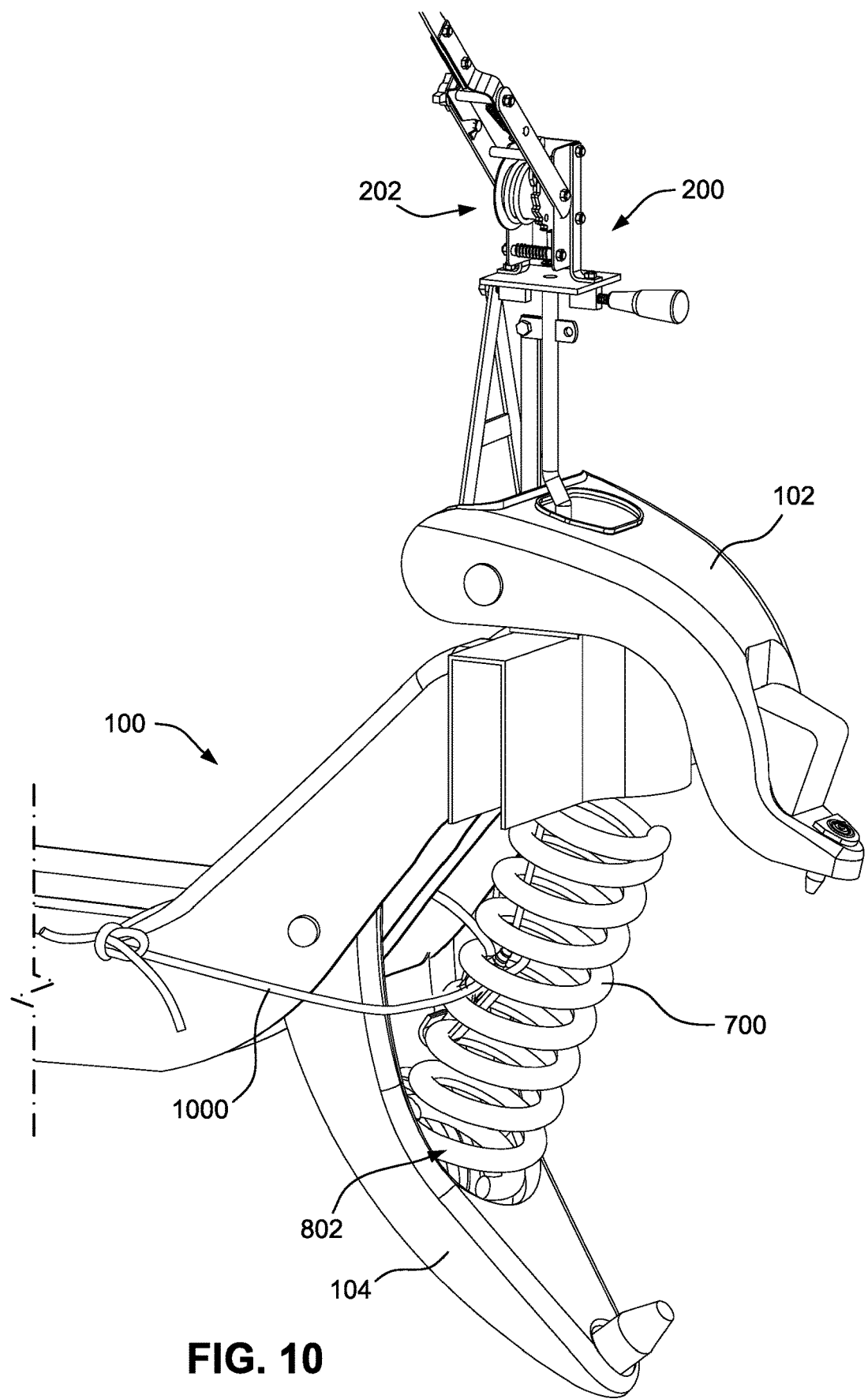
FIG. 10 shows the spring properly seated in the recess of the lower control arm, in accordance with certain example embodiments.

Continuing to operate the winch assembly 202 will continue to draw the spring 700 in towards the recess 802 of the lower control arm 104. The lower portion of the spring 700 can be further hand-guided towards the recess 802 until it is properly seated in the lower control arm 104, e.g., so that the coil is "timed" correctly. FIG. 10 shows the spring 700 properly seated in the recess 802 of the lower control arm 104, in accordance with certain example embodiments.

As shown in FIG. 10, a Dyneema cord 1000 or other secure rope or other fastening mechanism may be used to help secure the spring 700 in place, e.g., prior to or as the spring 700 is moved upwardly via the winch assembly 202. The cord 1000 can be looped around one of the coils of the spring 700 and around a portion of the sub-frame 100, and tied off. This may help protect against injuries caused by movement of the spring 700. An 8,700 lb. Dyneema cord may be used in certain example embodiments.

With the spring 700 properly seated in the recess 802 of the lower control arm 104, the J-hook assembly 2400, e.g., by simply pulling down on the cable 204 and/or the J-hook assembly 2400 to loosen the J-hook assembly 2400 off of the coil to which it is attached. The J-hook assembly 2400 optionally may be lowered all the way through the control arm in some instances.

Some configurations will not necessarily require the use of a J-hook assembly 2400 such as that shown and described. For example, other hook configurations may be used in different example embodiments. In still other example embodiments, the cable 204 may be looped around a coil and used for a similar purpose (e.g., provided that the cable 204 is sufficiently thick and resilient).

Figure 11:
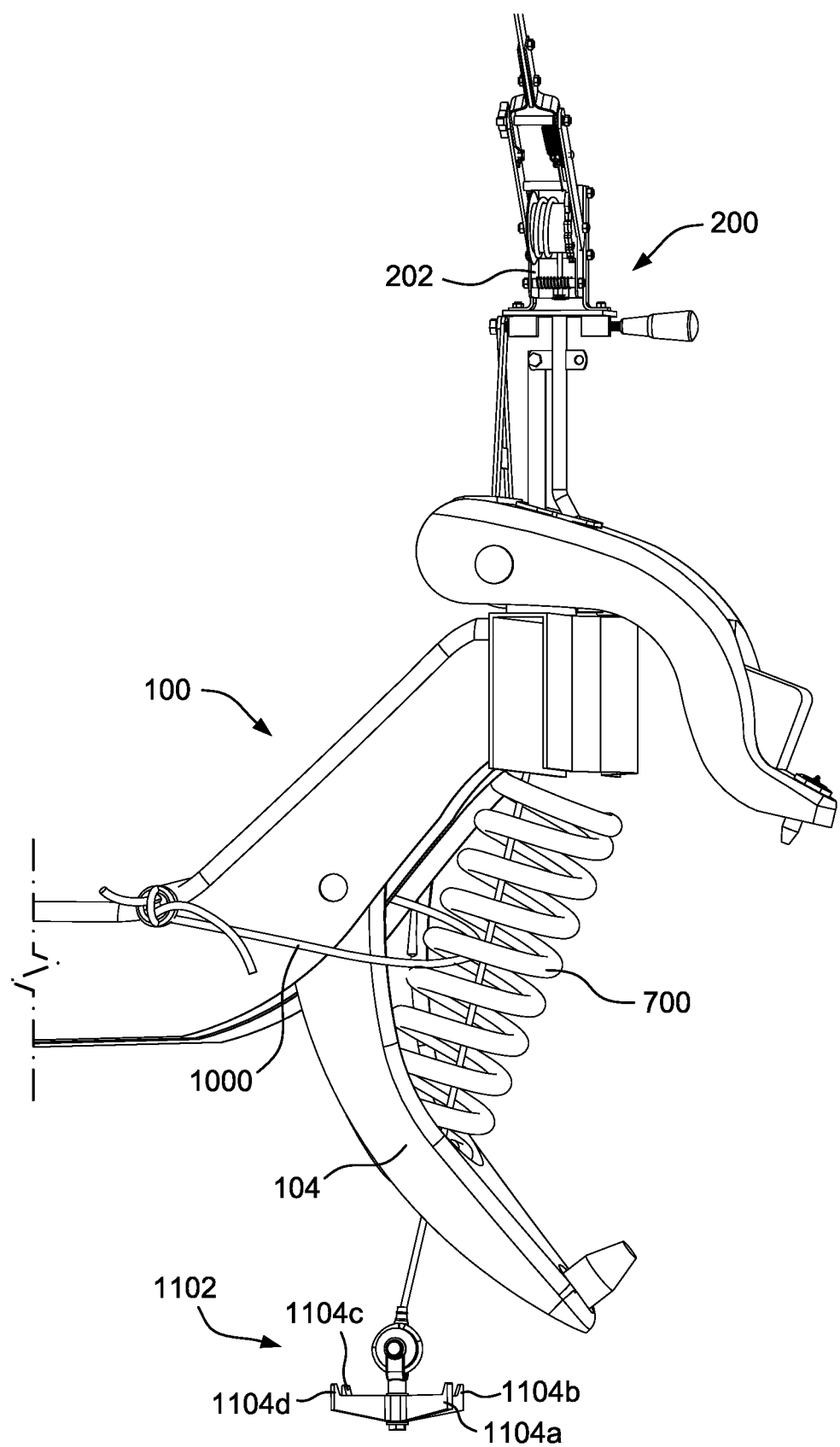
FIG. 11 shows a grappling unit connecting to the cable below the lower control arm, in accordance with certain example embodiments.

The cable 204 can be manipulated into the center of the spring 700, and the winch assembly 202 is released so that the cable 204 can extend through the lower control arm 104. FIG. 11 shows a grappling unit 1102 connecting to the cable 204 below the lower control arm 104, in accordance with certain example embodiments. This grappling unit 1102 fits underneath the lower control arm 104 and is used to draw the lower control arm upwardly. FIGS. 15A-16B show a grappling unit 1102 in accordance with certain example embodiments. Four grapple arms 1104a-1104d are shown in this example, although more or fewer grapple arms may be provided in different example embodiments. The X-shape for the grapple arms has been found to work with a wide variety of models, although other designs can be used in different example embodiments. The grappling unit 1102 includes a bolt 1502 connected to a roller bearing pulley assembly 1504 via a pin and cotter 1506. The bolt 1502 and/or pin may be one-half inch for at least some automotive applications. The loop 214 of the cable 204 fits around the pulley assembly 1504 and is secured using the pin and cotter pin 1506. The arrangement of the arms 1104a-1104d may be varied. However, it will be appreciated that the arrangement shown and described in connection with FIGS. 15A-16B is advantageous for at least some arrangements, including for some performance automobiles, where there is a bolt on the underside of the lower control arm 104 around which the arms 1104a-1104d of the grappling unit 1102 can fit, avoiding interference with this feature.

Figure 12:
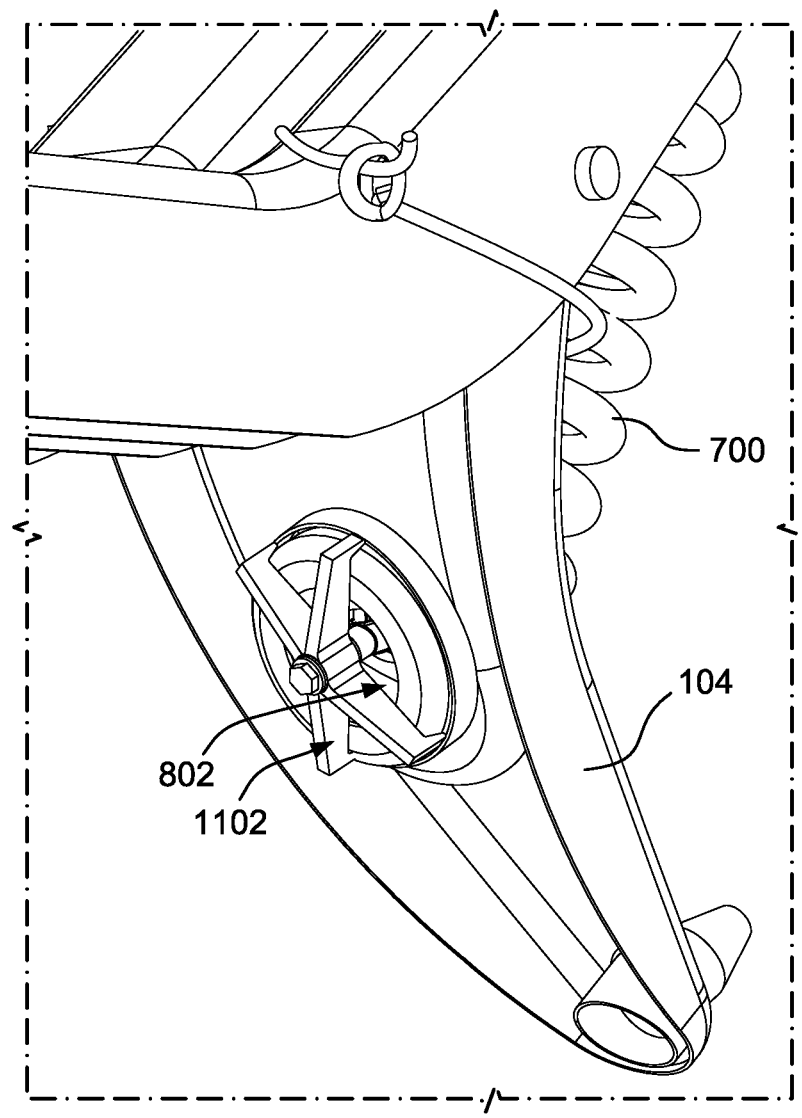
FIGS. 12-13 show the grappling unit secured to the undersigned of the lower control arm, in accordance with certain example embodiments.
Figure 13:
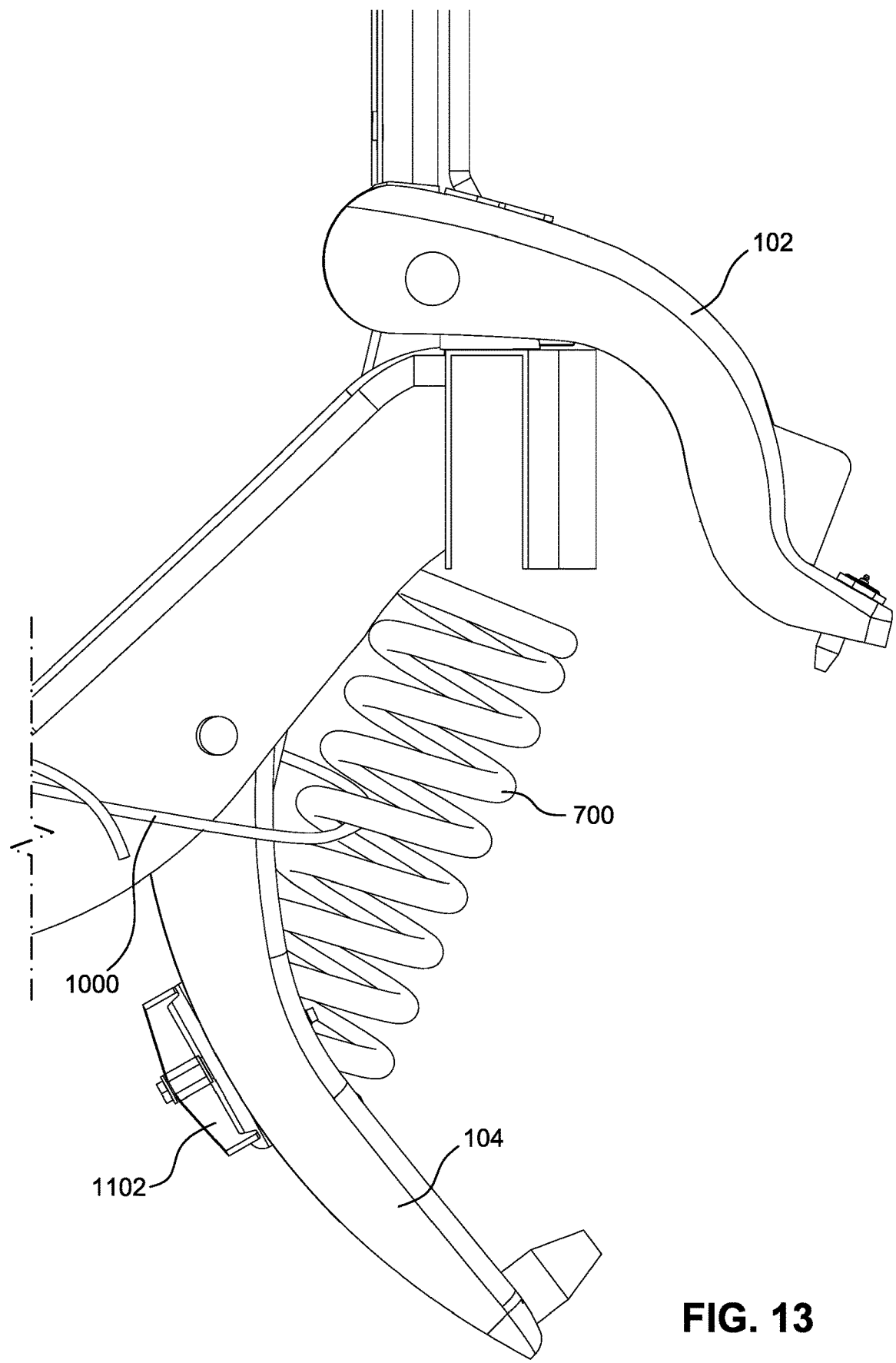

The winch assembly 202 is used to pull the grappling unit 1102 up towards the underside of the bottom control arm 104. FIGS. 12-13 show the grappling unit 1102 secured to the undersigned of the lower control arm 104, in accordance with certain example embodiments.

A spindle 1400 connects to the upper control arm 102 by being bolted to the upper ball joint 110, and the spindle 1400 connects to the lower control arm 104 by being bolted to the lower ball joint 112. The spindle 1400 first may be connected to the upper ball joint 110 or the lower control arm 104 at any appropriate time in the process. For example, it may be desirable to connect the spindle 1400 to the upper ball joint 110 after the grappling unit 1102 is attached, e.g., because that timing facilitates easy interchanging of components on the cable 204. The upper and lower ball joints 110, 112 are flexible, enabling the spindle 1400 to be manipulated somewhat so that it can be bolted to both relatively easily.

Figure 14:
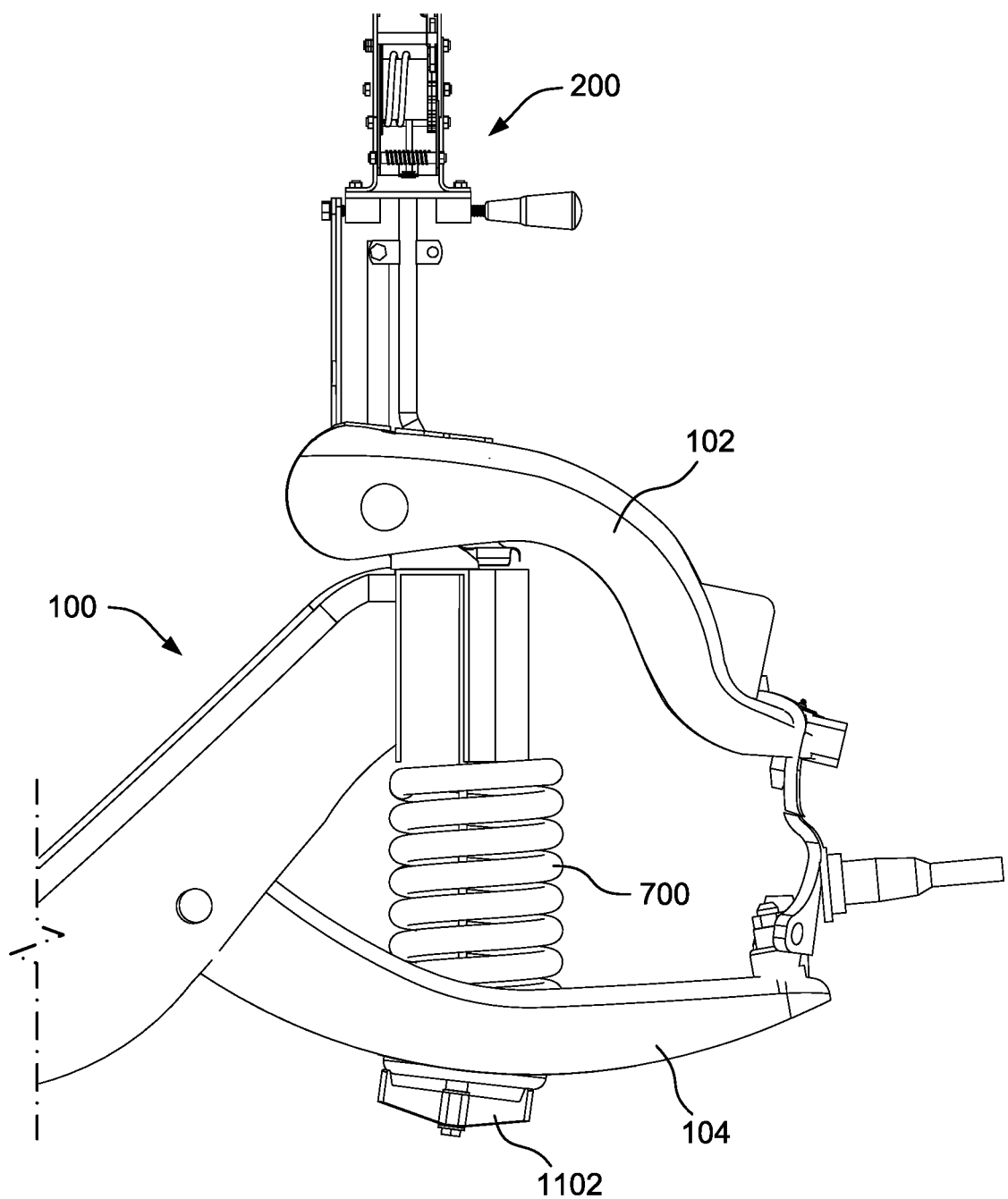
FIG. 14 shows the coil spring properly connected to the upper and lower control arms, with the spindle also installed, in accordance with certain example embodiments.
Figure 15A:
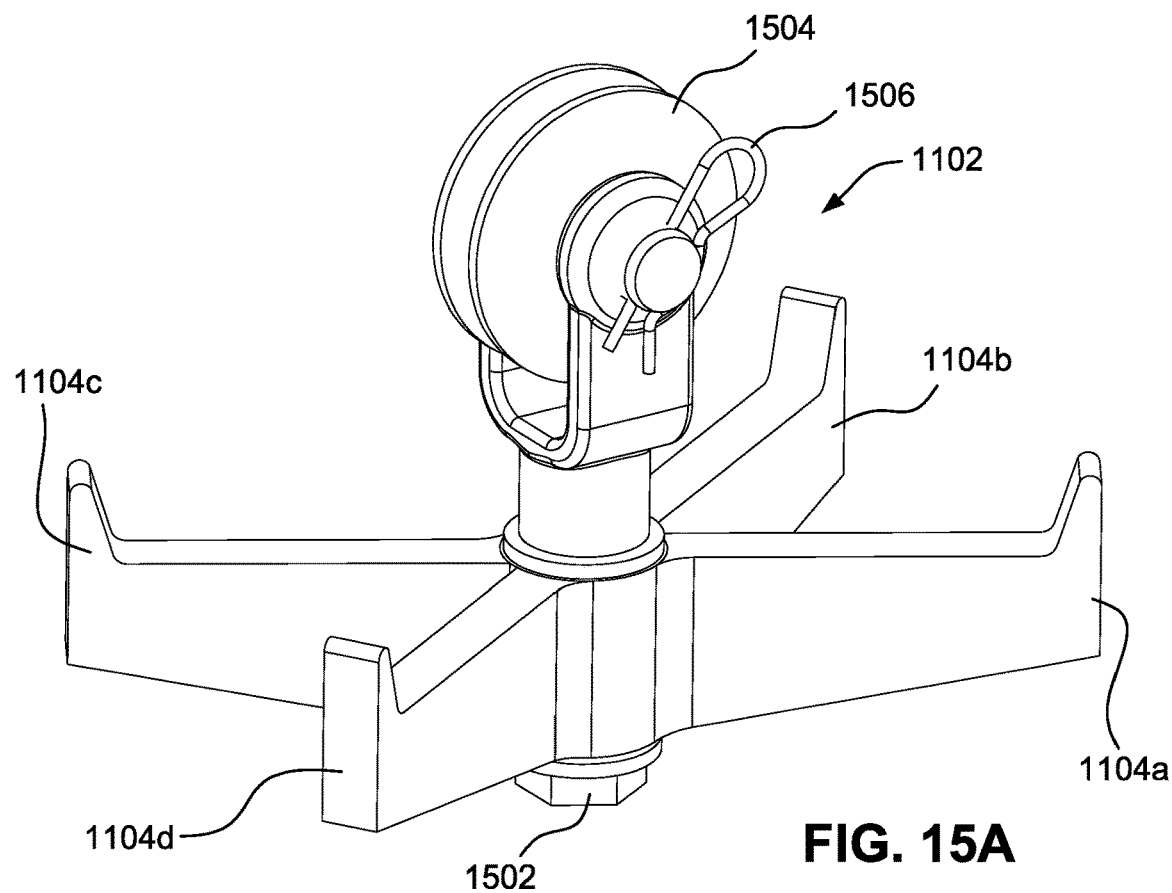
FIGS. 15A-16B show a grappling unit in accordance with certain example embodiments.
Figure 15B:
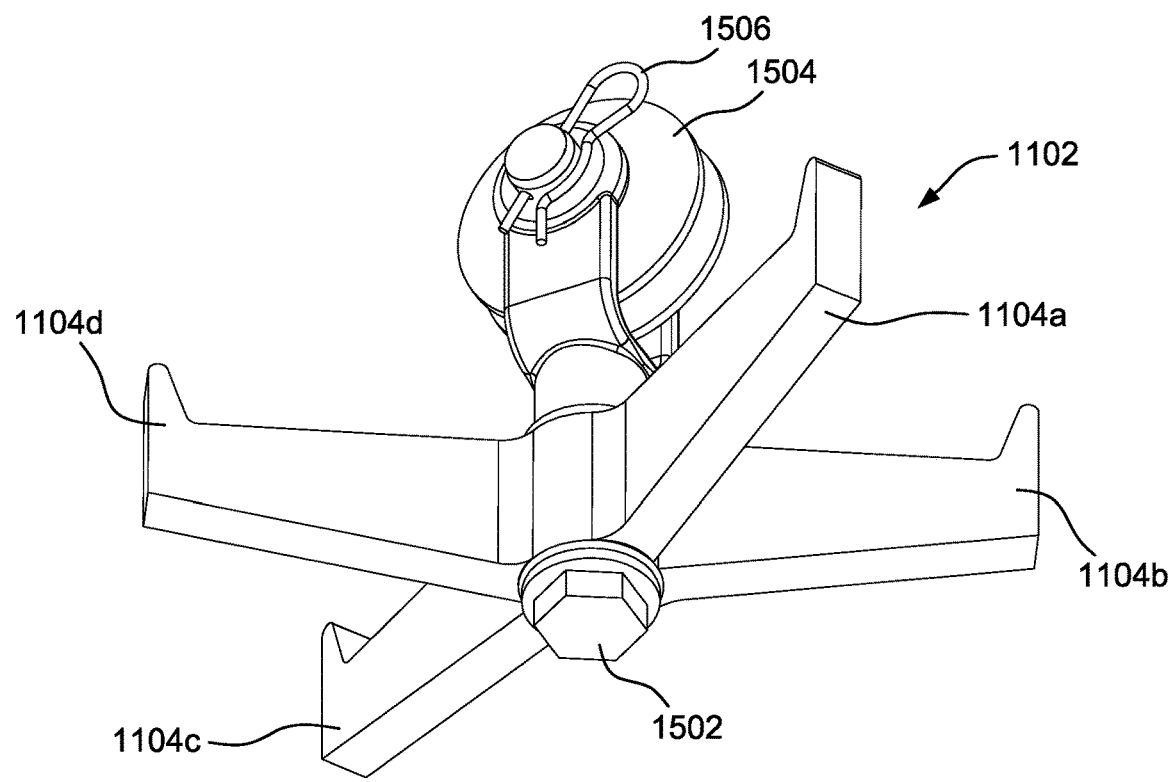
Figure 16A:
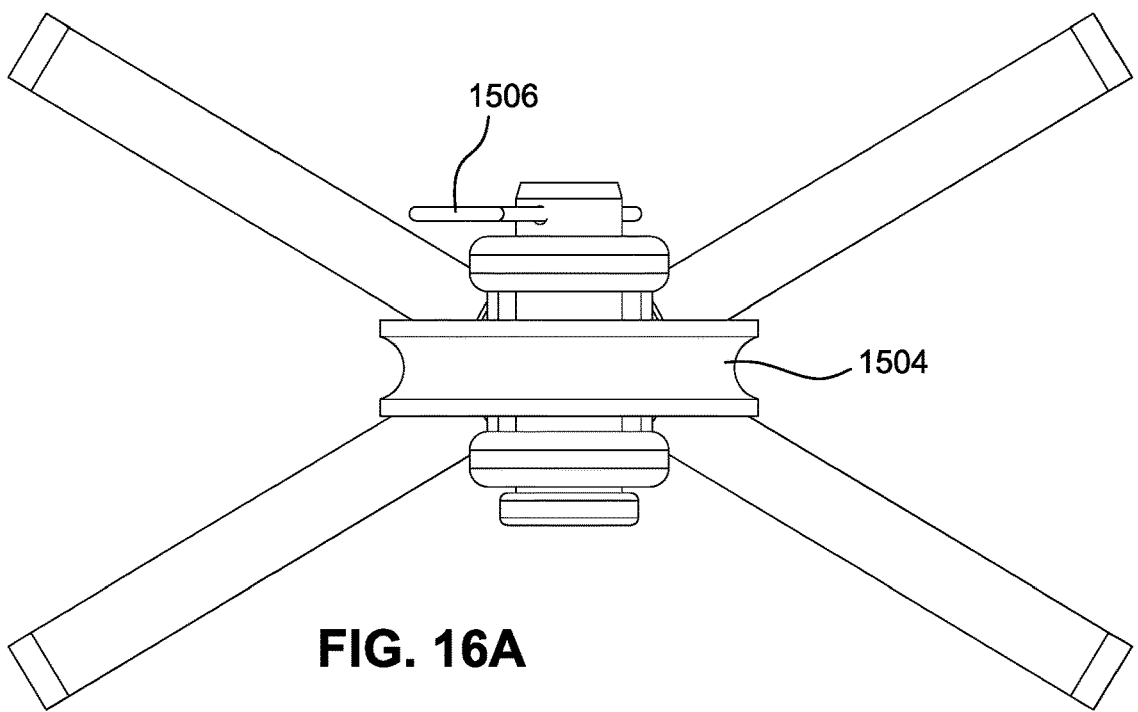
Figure 16B:
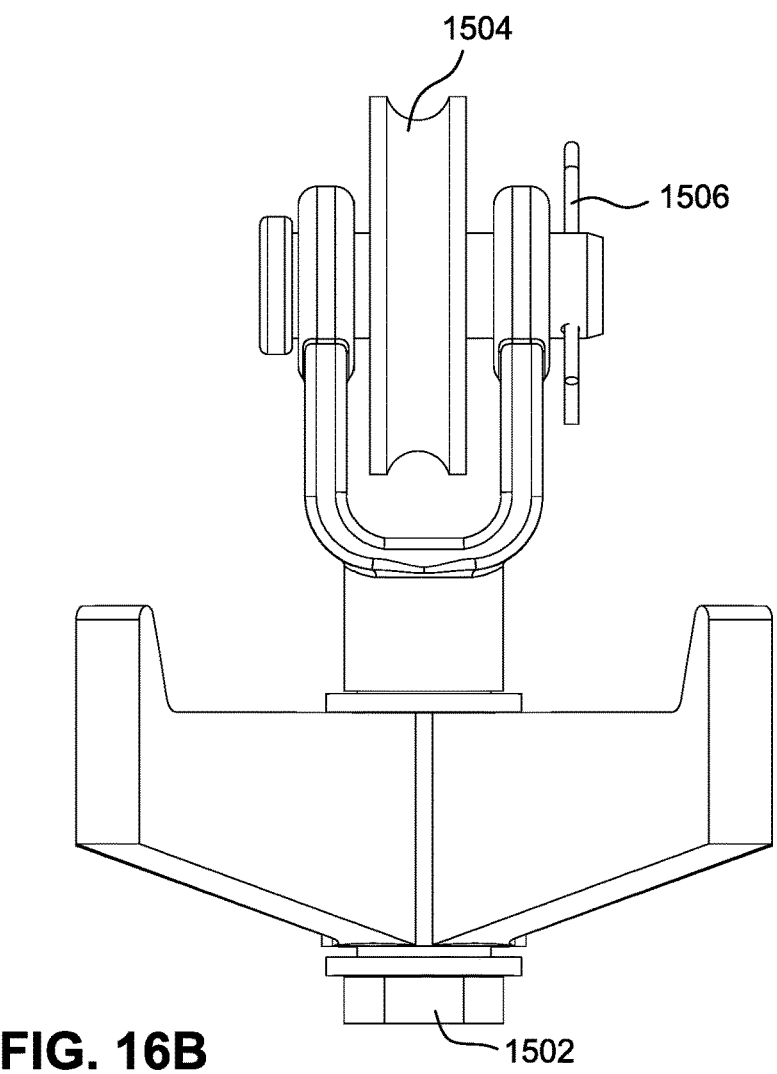

FIG. 14 shows the coil spring 700 properly connected to the upper and lower control arms 102, 104, with the spindle 1400 also installed, in accordance with certain example embodiments. Although not drawn to scale, it will be appreciated that the coils have moved much more closely together as a part of the installation procedure, and that the spring 700 itself has gone from a very straight shape into a more arcuate shape.

During installation, advantageously, the cable 204 (and the optional cord 1000) help protect the technician as tension is placed on the spring 700. Ample support and bracing also is provided for the device 200.

Coil springs typically are replaced at least in pairs. Therefore, once one side of a vehicle has had the coil installed, the device 200 can be removed, repositioned to the other side of the vehicle, and the process can be repeated.

Advantageously, the techniques of certain example embodiments provide an improvement compared to spring compressors that compress the spring and/or individual coils thereof, which can be difficult to operate and at times dangerous. Similarly, the techniques of certain example embodiments provide an improvement compared to hydraulic floor jacks that sit below the sub-frame and that use straps around the upper and lower control arms to try to draw up the spring.

Furthermore, the shock absorber hole advantageously is not damaged during installation, operation, and/or removal, of the device 200.

To remove the device 200, the cord 1000 is removed. The cable 214 and/or grappling unit 1102 is pulled downwardly (e.g., after the winch assembly 202 has been released). The cotter pin 1506 is removed, and the pulley 1504 is removed from the loop 214 of the cable 204. The additional brace 212 is unbolted and removed from the device 200, and the A-frame positioning brace 208 is unbolted and removed from both the device 200 and the sub-frame 100. The handle 210 can be removed as well. The device 200 can be lifted off of the sub-frame 100, with the cable 204 being lifted out from the spring and through the upper control arm 102.

Disassembly (for removal of a spring) works generally in reverse compared to the approach described in detail above. The device 200 is installed on the sub-frame 100, and the optional cord 1000 is tied into place. The cable 204 is dropped through the spring 700, and the grappling unit 1102 is connected thereto. Tension is placed on the spring 700 by having by having the grappling unit 1102 connected to the underside of the lower control arm 104. The spindle 1400 is removed (e.g., by unbolting it) from the upper and lower control arms 102, 104. The spring 700 is slowly let down via the winch assembly 202. The lower end of the spring 700 can be moved outwardly, and the J-hook assembly 2400 can be used to safely remove it.

Figure 17:
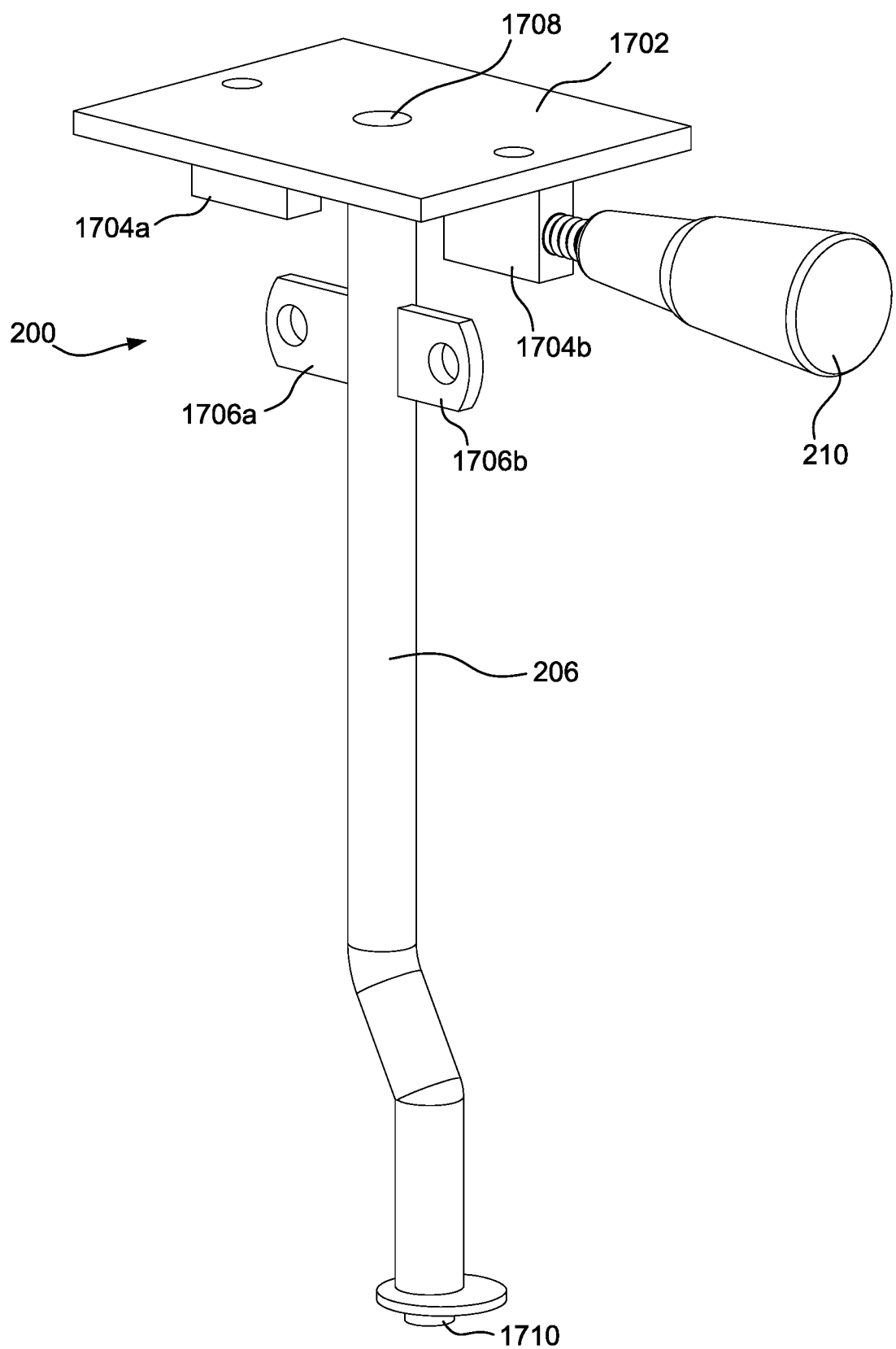
FIG. 17 shows a view of the device with the winch assembly removed from the plate, in accordance with certain example embodiments.
Figure 18:
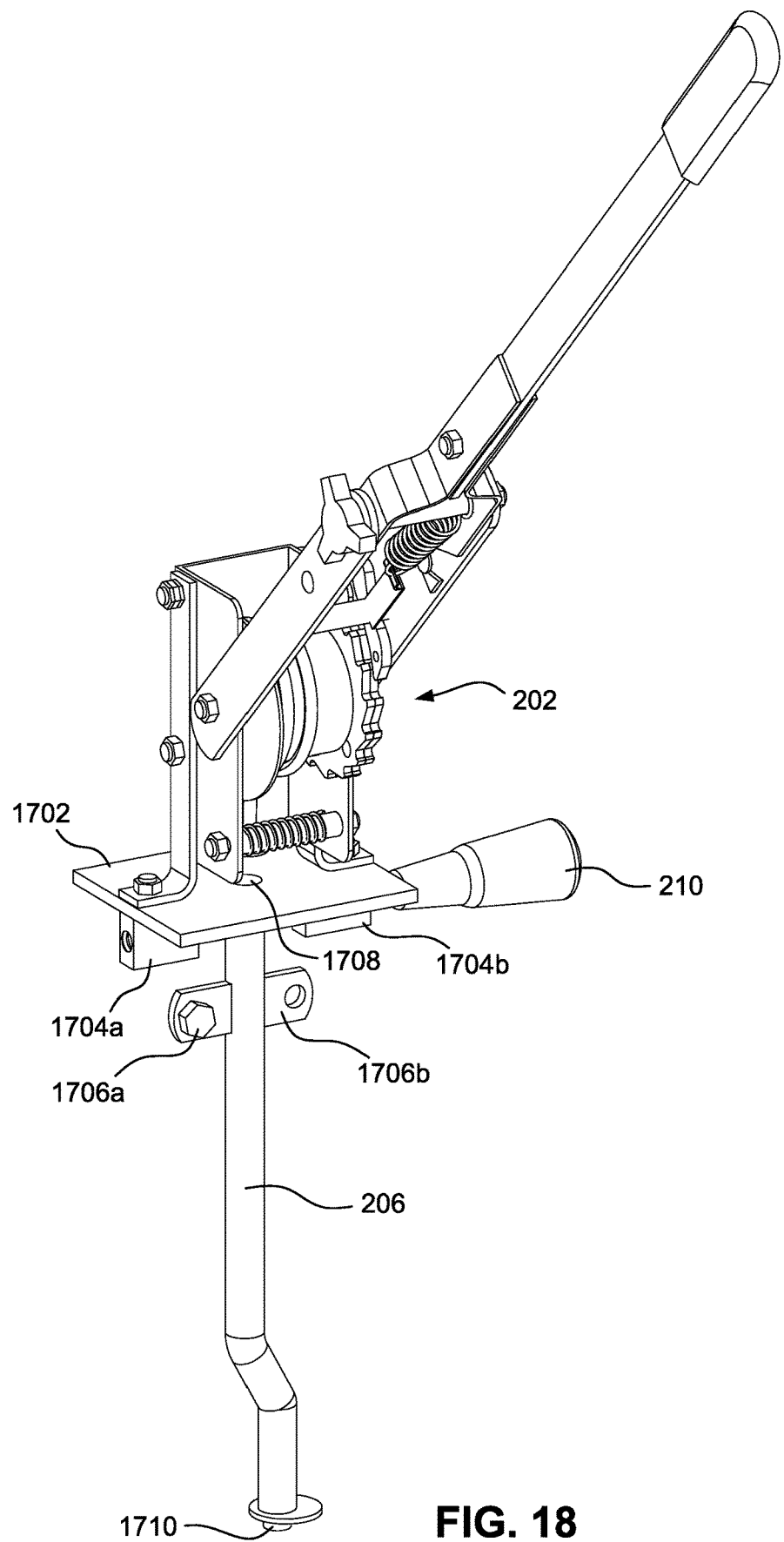
FIG. 18 shows the winch assembly bolted to the plate of the device in accordance with certain example embodiments.
Figure 19:
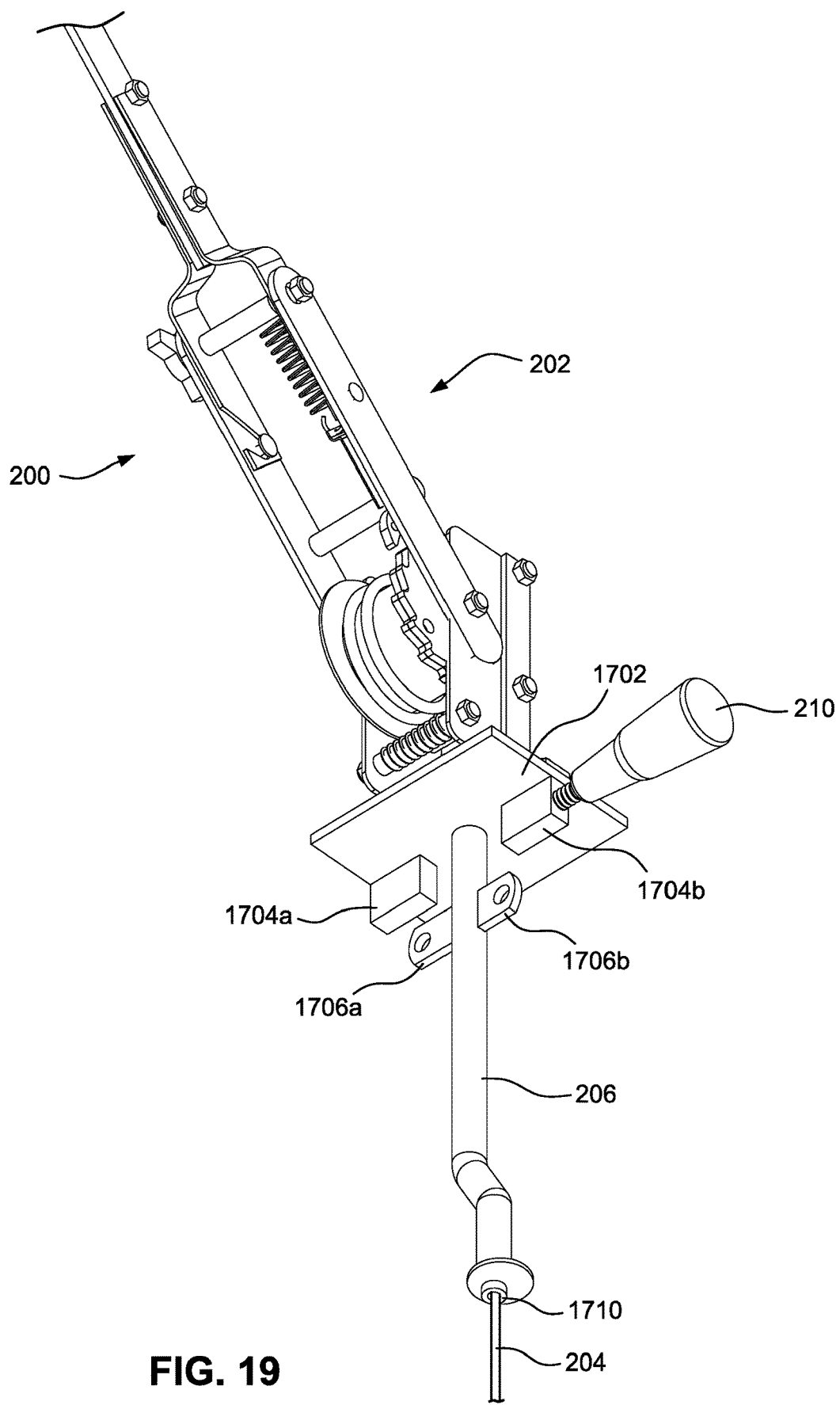
FIG. 19 shows the cable connected to the winch assembly and protruding outwardly from the bottom hole of the tubing, in accordance with certain example embodiments.

FIG. 17 shows a view of the device 202 with the winch assembly 202 removed from the plate 1702, in accordance with certain example embodiments, FIG. 18 shows the winch assembly 202 bolted to the plate 1702 of the device 200 in accordance with certain example embodiments, and FIG. 19 shows the cable 204 connected to the winch assembly 202 and protruding outwardly from the bottom hole 1710 of the tubing 204, in accordance with certain example embodiments. Referring to FIG. 17, holes formed in the plate 1702 can help accommodate the winch assembly 202, or other hoisting mechanisms. Blocks 1704*a*-1704*b* are provided on the plate 1702. These blocks 1704*a*-1704*b* accommodate the handle 210 (as shown in FIG. 17), as well as the A-frame positioning brace 208. The handle 210 and the A-frame positioning brace 208 can be connected to either one of the blocks 1704*a*-1704*b* so as to permit the device 200 to work on different sides of a vehicle.

Also as shown in FIG. 17, the device 200 includes the tubing 206 welded to the plate 1702. Tabs 1706*a*-1706*b* protrude from the tubing 206. The additional brace 212 can connect to either of the tabs 1706*a*-1706*b*, again permitting the device 200 to work on different sides of a vehicle.

The cable 204 passes through the tubing 206 and out through the upper hole 1708 to connect to the hoisting mechanism. The cable 204 also passes through the tubing 206 and out through the lower hole 1710. The loop 214 is formed at this end.

Figure 20:
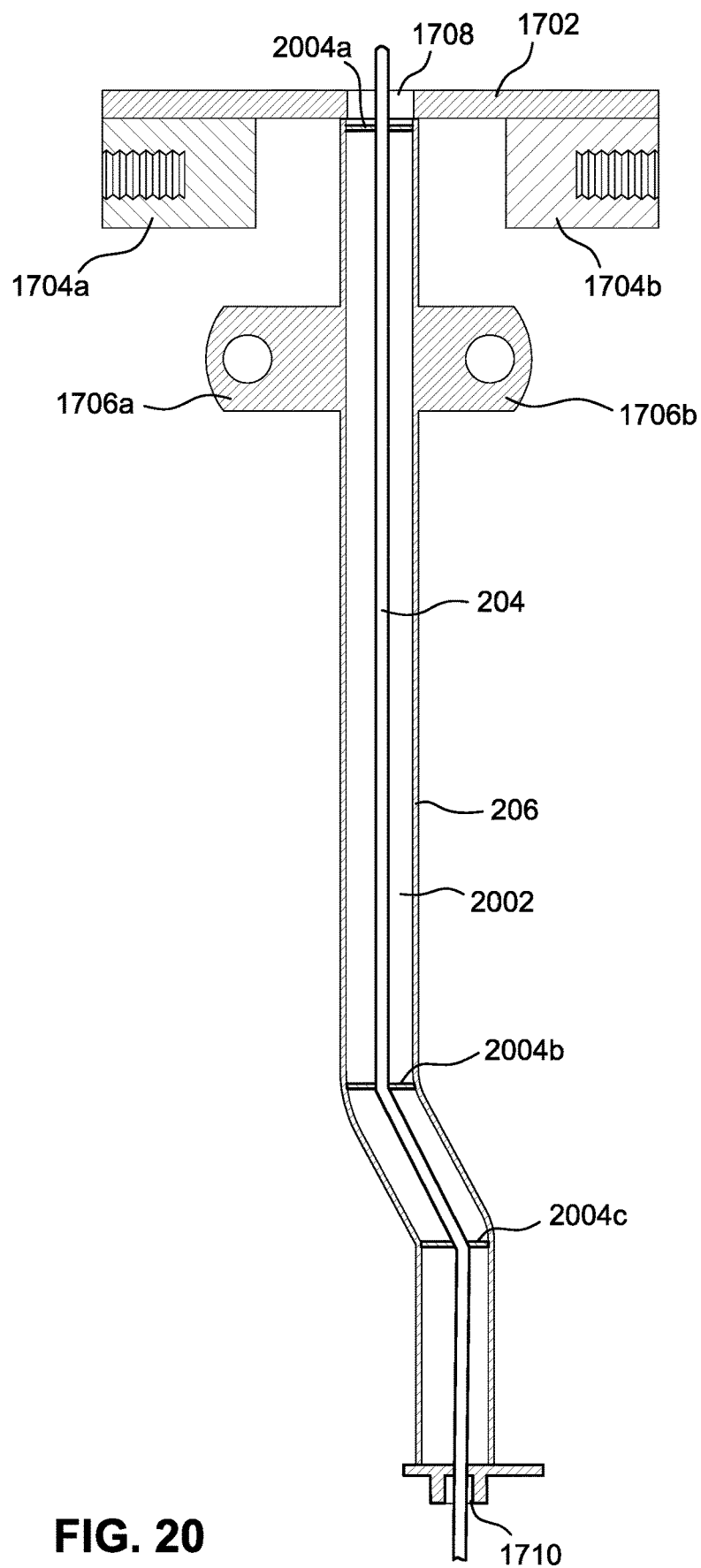
FIG. 20 is a cross-section of a portion of FIG. 19, in accordance with certain example embodiments.

FIG. 20 is a cross-section of a portion of FIG. 19, in accordance with certain example embodiments. As can be seen from FIG. 20, the tubing 206 has a hollow body 2002 that accommodates the cable 204. The cable 204 is guided through the body 2002 via a plurality of bushings 2004*a*-2004*c*. Although three bushings 2004*a*-2004*c* are shown in the FIG. 20 example, different embodiments may have more or fewer bushings. The bushings may be placed proximate to places where the tubing 206 bends (e.g., as the case with bushings 2004*b*-2004*c*), and/or where the cable enters into the tubing 204, proximate to the upper hole 1708 (as is the case with bushing 2004*a*). When there are longer runs of tubing, where the cable is substantially smaller in diameter than the hollow body of the tubing, etc., more bushings may be desirable.

The use of offset steel bushings may be advantageous in certain example embodiments. For example, they can help reduce the amount of wear placed on the cable located inside the tubing. The cables thus may be less likely to ear out quickly and/or to run through the sidewalls of the tubing. Offset bushing at turns also advantageously helps to provide a straighter shot for the cable through the tubing.

Figure 21:
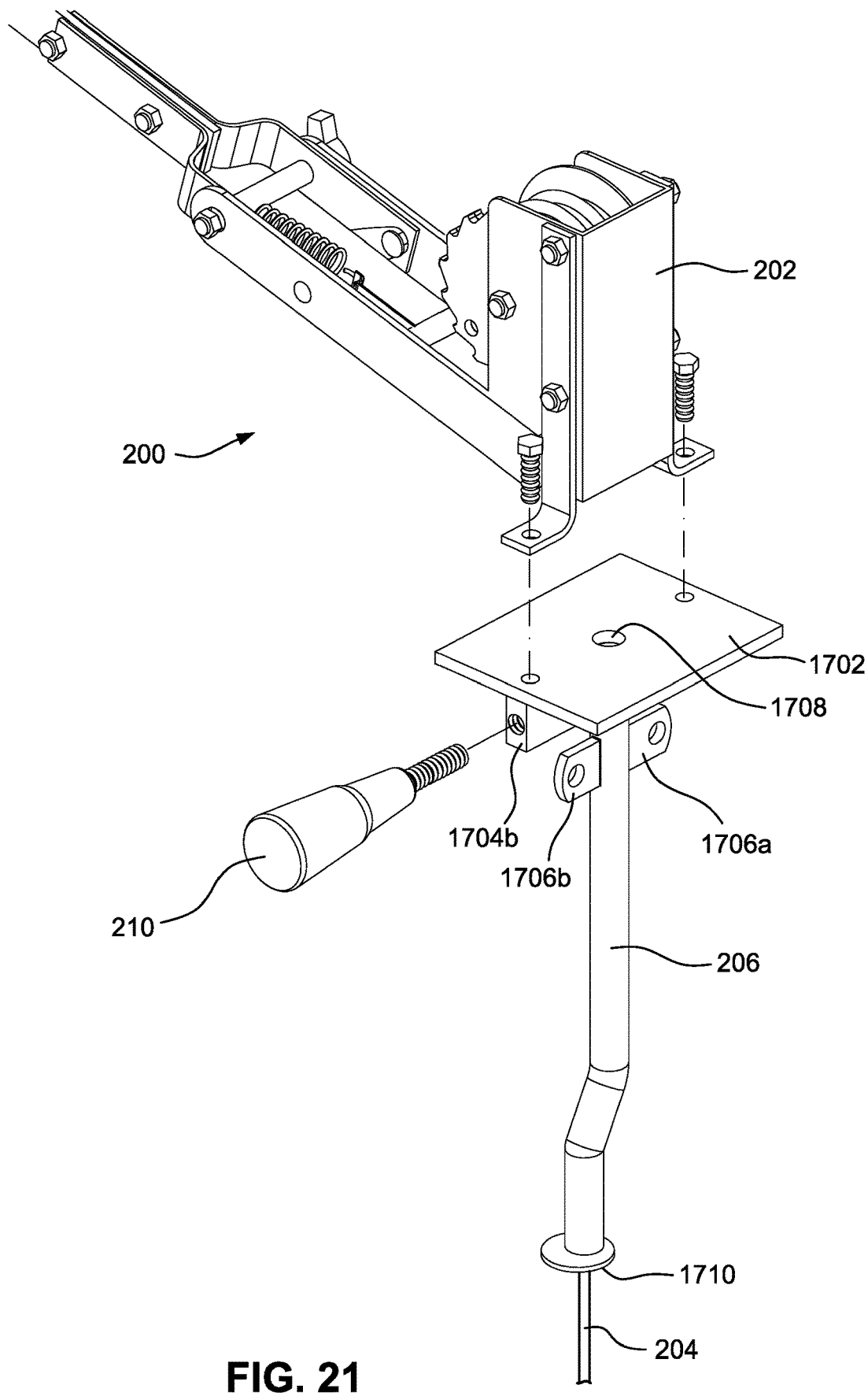
FIG. 21 shows how the winch assembly connects to the plate of the device, in accordance with certain example embodiments.

FIG. 21 shows how the winch assembly 202 connects to the plate 1702 of the device 200, in accordance with certain example embodiments. In this example, these components are bolted together.

Figures 25A, 25B:
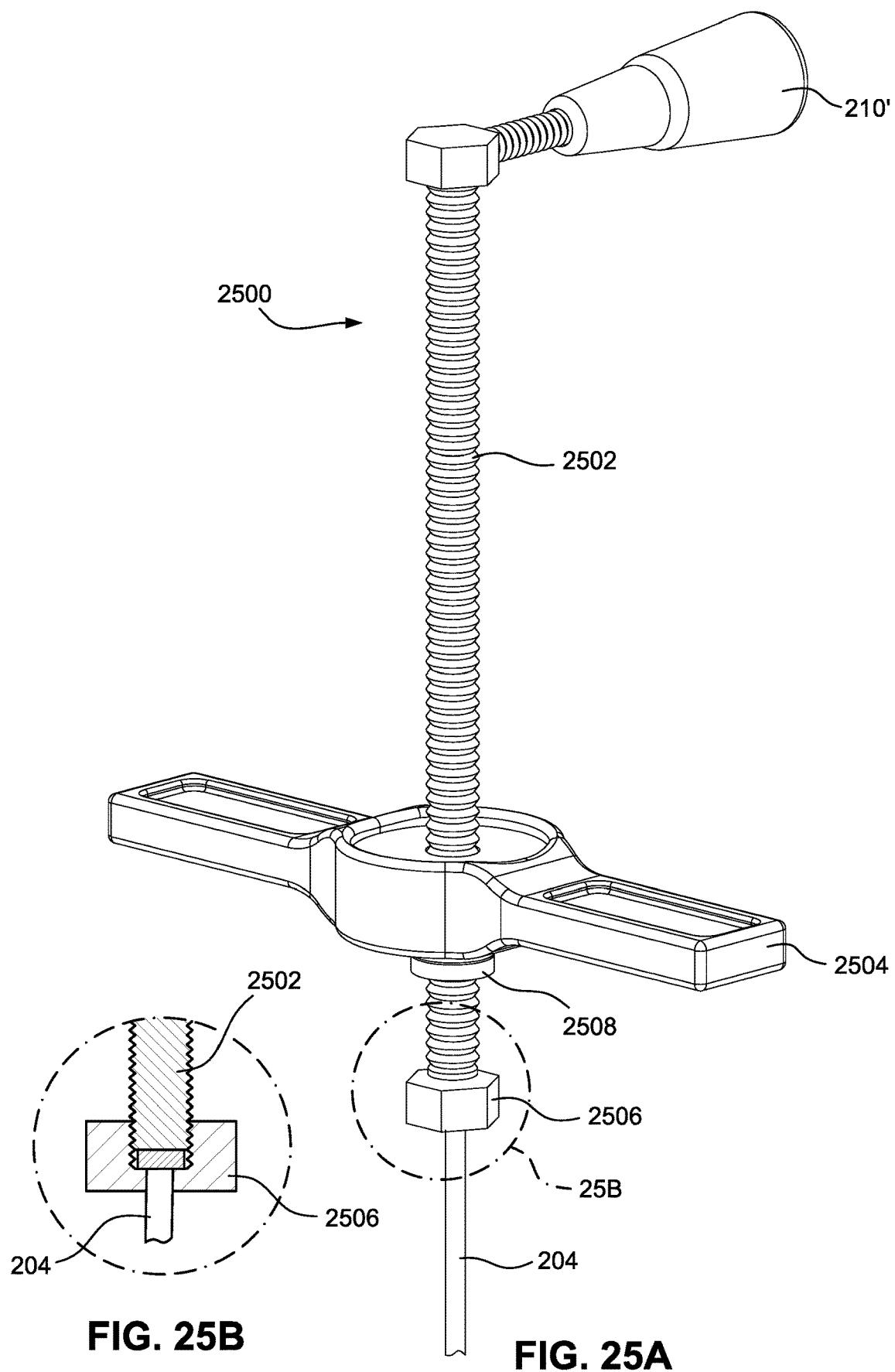
FIGS. 25A-25B show a crank assembly including an acme rod with a hand crank in accordance with certain example embodiments.

FIG. 2 shows a manual, hand-drive winch assembly 202. In certain example embodiments, a different kind of winch assembly could be used. For example, an electric winch, foot driven, or other winch could be used in different example embodiments. Moreover, there are numerous ways in which the cable 204 can be lifted and/or lowered, and a winch assembly need not necessary be used. For example, FIGS. 25A-25B show a crank assembly 2500 including an acme rod 2502 (e.g., with a 0.5 inch diameter suitable for some automotive applications) with a hand crank 2504 in accordance with certain example embodiments, and this crank assembly 2500 may be used to lift and/or lower the cable 204. Any hoisting mechanism may be used in connect with different example embodiments. As shown in the enlarged cross-sectional region of FIG. 25B, the cable 204 can be welded to the lower portion of the rod 2502 and protected by a nut 2506 or the like.

The removable handle 210' can be held, and the hand crank 2504 can be used to turn the crank assembly 2500 to perform actions similar like the winch assembly 202 discussed in detail above. This configuration may be desirable because it is compact and easy to operate. A brake function may be provided.

Figure 26:
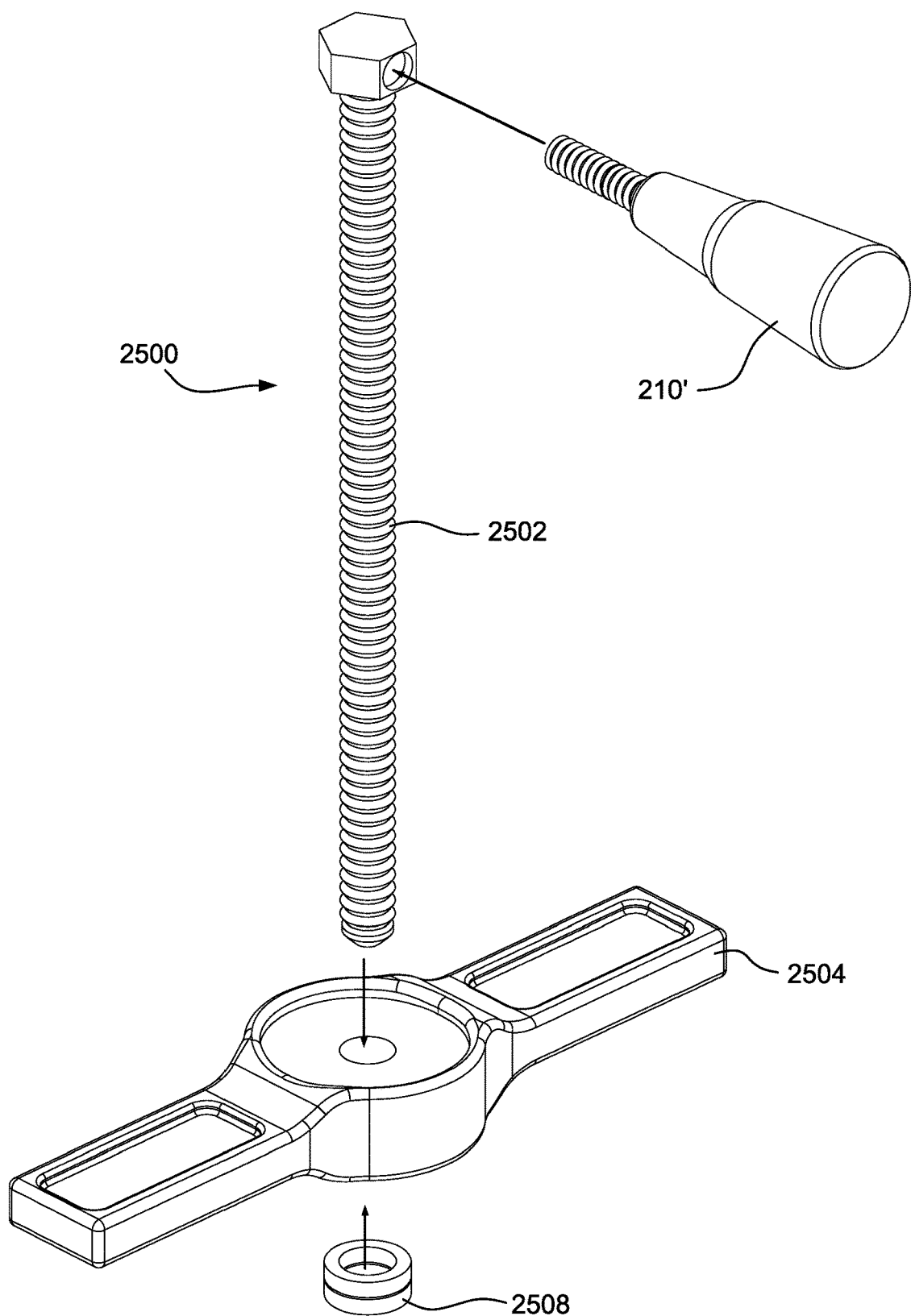
FIG. 26 is an exploded view of a portion of the crank assembly shown in FIG. 25A, in accordance with certain example embodiments.

FIG. 26 is an exploded view of a portion of the crank assembly 2500 shown in FIG. 25A, in accordance with certain example embodiments. As will be appreciated from FIG. 26, a feature 2508 can be used to help secure the hand crank 2504 to the rod 2502.

Figure 27:
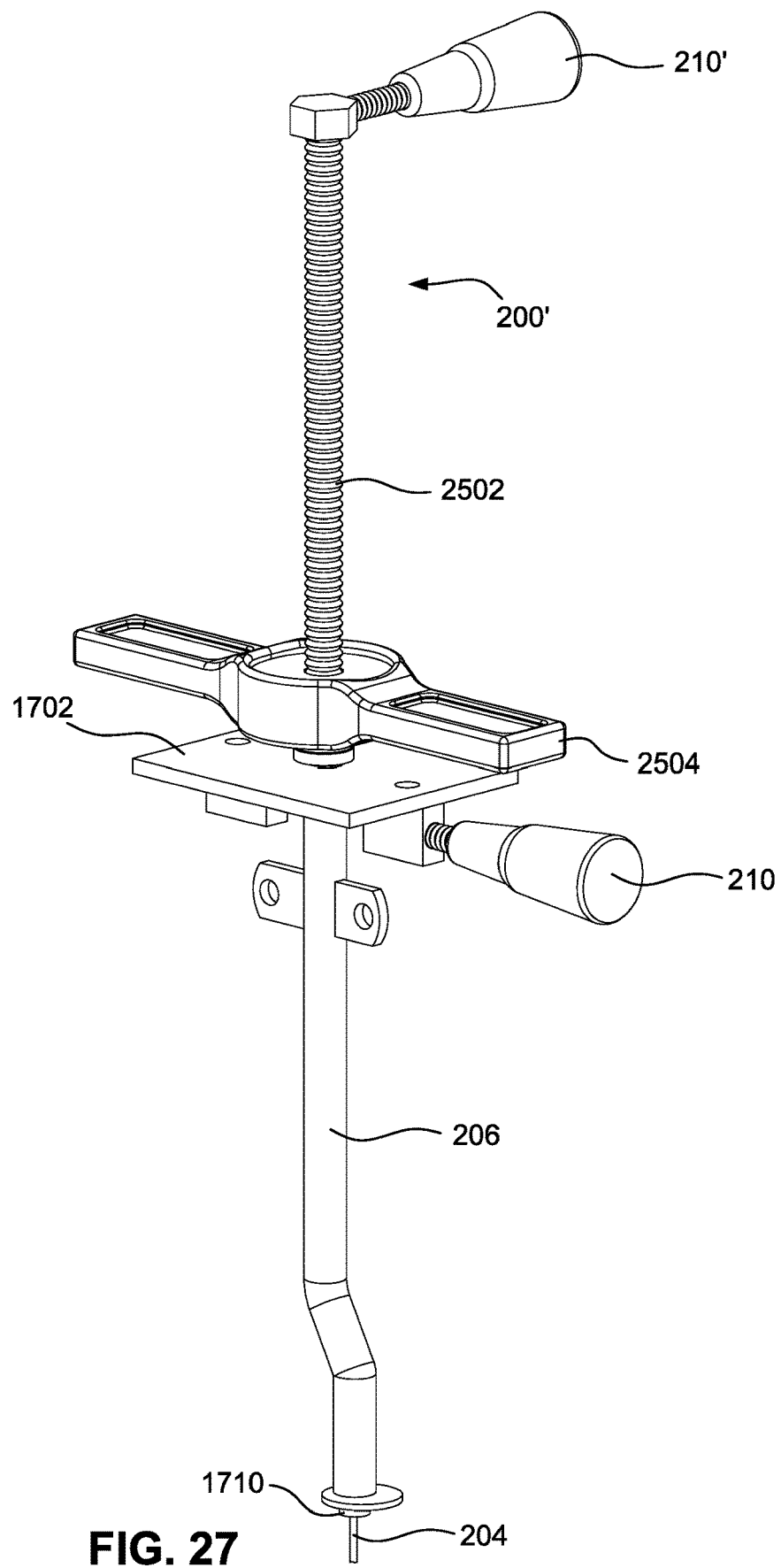
FIG. 27 shows the crank assembly installed on the base in connection with an alternate device, in accordance with certain example embodiments.

FIG. 27 shows the crank assembly 2500 installed on the base 1702 in connection with an alternate device 200', in accordance with certain example embodiments. The cable 204 connected to the rod 2502 still protrudes through the tubing 206 and outwardly from the bottom hole 1710.

Although certain example embodiments have been shown as being used on one side, it will be appreciated that the tooling on the device 200 permit springs to be installed on "either side" of a vehicle. In this regard, in the FIG. 2 example, the handle 210 is held with the right hand as the winch assembly 202 is operated with the left hand. However, as can be seen from the drawings, the location of the A-frame positioning brace 208, handle 210, etc., can be "reversed" so that the handle 210 can be held with the left hand as the winch assembly 202 is operated with the right hand. This adds flexibility to the overall design of the device 200.

The examples provided above largely related to a 1969 Pontiac Firebird. However, the same frame was present on 1967-1981 vehicles provided by General Motors (GM), as well as at least some 1950s era GM vehicles. Thus, these particular examples are applicable to a wide range of vehicles. Different automobiles (such as 1967-1970 Ford Mustangs) may use straight tubing. However, as noted above, the techniques described herein can be used in connection with any vehicle that uses a coil spring such as, for example, a truck, tractor, trailer, airplane, and/or the like.

The current 15 degree angle for the dogleg of the tubing works with classic GM models including those noted above. However, this dogleg will not be required for at least some different applications.

FIG. 28 is a perspective view of an offset single point attachment 2800 that may be used to lift and/or compress the spring 700, in accordance with certain example embodiments. FIG. 29 shows the attachment 2800 connected to the spring 700, in accordance with certain example embodiments. In this way, the attachment 2800 can replace the functionality of either or both of the J-hook assembly 2400 and the grappling unit 1102. The attachment 2800 would fit between the coils of the spring 700 after it is attached to the cable 204', as shown in FIG. 29. The technician can compress the spring 700 and attach the lower control arm 204 to the spindle 1400. It could then be removed and the shock absorber could be reinstalled. As shown in FIGS. 28-29, the cable 204' can be connected through the hole in feature 2802. That feature is provided on the cross-member 2804, which may in some instances have a 4 inch major length. First and second hooks 2806*a*-2806*b* extend from the outer edges of the cross-member 2804. The major distance from the outer edge of first hook 2806a to the outer edge of second hook 2806b may be 1 inch in certain example embodiments. As noted above, and as can be seen from the drawings, the heights of the hooks 2806a-2806b are offset in the example shown in FIGS. 28-29. The lower of the two hooks may have a height of 1 inch, and the other may have a height of 0.5 inches, in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle coil clamping kit, comprising:
   a hoisting mechanism;
   a device comprising a plate, tubing, and a cable, wherein the tubing and the hoisting mechanism are located on opposing sides of the plate, the cable being connected to the hoisting mechanism and running through a body of the tubing such that at least a portion of the cable protrudes through an end of the tubing opposite the plate, the cable being movable in response to manipulation of the hoisting mechanism;
   at least one support member removably connectable to the device and a frame of a vehicle that a coil is to be installed into or removed from; and
   at least one hook connectable to the cable;
   wherein the tubing is insertable into, and the cable is feedable through, the frame, when the device is connected to the frame via the at least one support member;
   wherein the coil is locatable in the frame between upper and lower portions thereof; and
   wherein the at least one hook is configured to controllably raise the lower portion of the frame and deform the spring when the spring is being installed, and wherein the at least one hook is configured to permit the lower portion of the frame to be controllably lowered when the spring is being removed.

2. The vehicle coil clamping kit of claim 1, wherein the hoisting mechanism is a winch.

3. The vehicle coil clamping kit of claim 1, wherein the at least one support member is an A-frame.

4. The vehicle coil clamping kit of claim 1, wherein the at least one support member comprises a first support member and a second support member, the first support member being an A-frame and the second support member being a rod with a portion sized, shaped, and arranged to fit around a portion of the frame.

5. The vehicle coil clamping kit of claim 1, wherein the at least one hook is a grappling hook.

6. The vehicle coil clamping kit of claim 1, wherein the at least one hook comprises first and second hooks, the first hook being a grappling hook and the second hook being a J-shaped hook.

7. The vehicle coil clamping kit of claim 6, wherein the J-shaped hook is sized, shaped, and arranged to hook around a coil of the spring during partial location of the spring during spring installation and during removal of the spring.

8. The vehicle coil clamping kit of claim 6, wherein the grappling hook is configured to controllably raise the lower portion of the frame and deform the spring when the spring is being installed, and to permit the lower portion of the frame to be controllably lowered when the spring is being removed.

9. The vehicle coil clamping kit of claim 1, wherein the at least one hook is an attachment having a cross member and first and second curved hook portions, the cross member having first and second sides opposite one another, the first and second curved hook portions extending downwardly from the first and second sides, respectively, wherein the first and second curved hook portions have different heights and are configured to interface with different portions of the spring.

10. The vehicle coil clamping kit of claim 1, wherein the hoisting mechanism is a hand crank.

11. The vehicle coil clamping kit of claim 1, wherein:
    the tubing comprises first, second, and third portions;
    the first and second portions are substantially parallel to one another are separated from one another by the third portion; and
    the cable extends through each of the first, second and third portions.

12. The vehicle coil clamping kit of claim 11, wherein offset bushings are provided in the tubing to help route the cable therethrough, the offset bushings being located at least proximate to where the first and second portions meet and where the second and third portions meet.

13. The vehicle coil clamping kit of claim 1, further comprising a band that is to be tied around the frame and the spring to restrict movement of the spring during spring installation/removal.

14. A method of installing a spring in a frame of a vehicle, the frame having upper and lower portions between which the spring is to be located, the method comprising:
    having the vehicle coil clamping kit of claim 1;
    connecting the device to the frame via the at least one support member;
    feeding the cable through at least the upper portion of the frame;
    partially locating the spring in the frame between the upper and lower portions of the frame;
    feeding the cable through the lower portion of the frame;
    allowing the at least one hook to contact an underside of the lower portion of the frame; and
    drawing the lower portion of the frame closer to the upper portion of the frame using the hoisting mechanism such that the spring controllably deforms into a fully located, installed position.

15. The method of claim 14, wherein the at least one hook comprises first and second hooks, the first hook being a grappling hook and the second hook being a J-shaped hook.

16. The method of claim 15, further comprising:
    attaching the J-shaped hook around a coil, wherein the partial locating of the spring in the frame is performed with the J-shaped hook attached to the coil; and
    feeding the cable through the lower portion of the frame after the spring is partially located;
    wherein the grappling hook is allowed to contact the underside of the lower portion of the frame.

17. The method of claim 14, wherein the vehicle is an automobile, and the upper and lower portions of the frame are upper and lower control arms of the automobile.

18. A method of removing a spring from a frame of a vehicle, the frame having upper and lower portions between which the spring is located, the method comprising:
    having the vehicle coil clamping kit of claim 1;
    connecting the device to the frame via the at least one support member;
    feeding the cable through at least the upper and lower portions of the frame;

allowing the at least one hook to contact an underside of the lower portion of the frame;

controllably lowering the lower portion of the frame using the hoisting mechanism such that tension on the spring is controllably released; and once a threshold amount of tension on the spring has been released, removing the spring from the frame.

19. The method of claim 18, wherein the vehicle is an automobile, and the upper and lower portions of the frame are upper and lower control arms of the automobile.

20. A coil clamping device for installing between/removing from upper and lower arms of a frame of a vehicle a spring, the device comprising:

a hoisting mechanism;

a plate;

tubing, wherein the tubing and the hoisting mechanism are located on opposing sides of the plate;

a cable connected to the hoisting mechanism and running through a body of the tubing such that at least a portion of the cable protrudes through an end of the tubing opposite the plate, the cable being movable in response to manipulation of the hoisting mechanism, the cable being lowerable through the lower arm of the frame of the vehicle when the spring is being installed/removed;

one or more mounts to which at least one support member is removably connectable, the at least one support member also being removably connectable to the frame; and at least one hook connected to the cable and configured to engage with an underside of the lower arm to enable the lower arm to be controllably raised and to deform the spring during spring installation, and to permit the lower arm of the frame to be controllably lowered and to release spring tension during spring removal.

\* \* \* \* \*